(12) United States Patent
Carin et al.

(10) Patent No.: US 7,024,796 B2
(45) Date of Patent: Apr. 11, 2006

(54) PROCESS AND APPARATUS FOR MANUFACTURE OF FERTILIZER PRODUCTS FROM MANURE AND SEWAGE

(75) Inventors: Christianne Carin, Priddis (CA); Brian N. Gorbell, deceased, late of Priddis (CA); by Christianne Carin, legal representative, Priddis (CA); Alvin W. Fedkenheuer, Calgary (CA); John S. Jonasson, Tisdale (CA); Alexander Starosud, Calgary (CA)

(73) Assignee: EarthRenew, Inc., Half Moon Bay, CA (US)

( * ) Notice: Subject to any disclaimer, the term of this patent is extended or adjusted under 35 U.S.C. 154(b) by 0 days.

(21) Appl. No.: 10/894,645

(22) Filed: Jul. 19, 2004

(65) Prior Publication Data

US 2006/0010712 A1    Jan. 19, 2006

(51) Int. Cl.
    *F26B 3/08*    (2006.01)
(52) U.S. Cl. ............... 34/363; 34/381; 34/487; 34/507; 34/514; 60/780
(58) Field of Classification Search ............ 34/363, 34/381, 413, 417, 443, 487, 507, 514; 60/780, 60/781; 435/290.1
    See application file for complete search history.

(56) References Cited

U.S. PATENT DOCUMENTS

| | | | |
|---|---|---|---|
| 4,128,946 A | 12/1978 | Maffet | |
| 4,220,463 A | 9/1980 | Van Hijfte et al. | |
| 4,745,868 A * | 5/1988 | Seabury | 110/234 |
| 4,957,049 A | 9/1990 | Strohmeyer, Jr. | |
| 4,997,469 A | 3/1991 | Moore | |
| 5,354,349 A | 10/1994 | Inoue | |
| 5,535,528 A | 7/1996 | Finkam | |
| 5,570,517 A | 11/1996 | Luker | |
| 5,653,872 A | 8/1997 | Cohan | |
| 5,676,729 A | 10/1997 | Elrod et al. | |
| 5,685,153 A | 11/1997 | Dickinson et al. | |
| 5,746,006 A | 5/1998 | Duske et al. | |
| 6,039,774 A | 3/2000 | McMullen et al. | |
| 6,125,633 A | 10/2000 | Strohmeyer, Jr. | |

(Continued)

FOREIGN PATENT DOCUMENTS

EP    0 677 237    3/1997

OTHER PUBLICATIONS

Miscellaneous pages from Duske Engineering.com, http://www.duskeengineering.com, 11 pp.

(Continued)

*Primary Examiner*—S. Gravini
(74) *Attorney, Agent, or Firm*—T. Gene Dillahunty, Esq.; Buchanan Ingersoll PC

(57) ABSTRACT

This invention discloses systems and methods for conversion of manure to novel fertilizer and/or soil builder products useful as input for organic farming operations. The equipment systems comprise a gas turbine generator unit (preferred heat source), a dryer vessel and a processing unit, wherein the connection between the gas turbine and the dryer vessel directs substantially all the gas turbine exhaust into the dryer vessel and substantially precludes the introduction of air into the dryer vessel. The dryer vessel receives the manure for contact with the turbine exhaust gases to convert the manure to a dry material, which is passed to the processing unit where it is formed into granules, pellets or other desired form for the final dry fertilizer product. The method comprises drying, heating and converting the manure to form novel self binding fertilizer and soil builder type products for organic farming and other uses.

5 Claims, 5 Drawing Sheets

U.S. PATENT DOCUMENTS

| | | |
|---|---|---|
| 6,171,499 B1 | 1/2001 | Bouchalat |
| 6,173,508 B1 | 1/2001 | Strohmeyer, Jr. |
| 6,189,234 B1 | 2/2001 | Luker |
| 6,197,081 B1 | 3/2001 | Schmidt |
| 6,293,985 B1 | 9/2001 | Phinney |
| 6,325,837 B1 | 12/2001 | Lentz |
| 6,367,163 B1 | 4/2002 | Luker |
| 6,451,589 B1 | 9/2002 | Dvorak |
| 6,461,399 B1 | 10/2002 | Connell |
| 6,497,741 B1 | 12/2002 | Sower |
| 6,506,311 B1 | 1/2003 | DeGarmo et al. |
| 6,517,600 B1 | 2/2003 | Dinel |
| 6,524,632 B1 | 2/2003 | Kartchner |
| 6,534,105 B1 | 3/2003 | Kartchner |
| 6,584,936 B1 | 7/2003 | Rivard |
| 6,613,562 B1 | 9/2003 | Dvorak |
| 6,623,546 B1 | 9/2003 | Bourdel |
| 6,638,757 B1 | 10/2003 | Teran et al. |
| 6,645,267 B1 | 11/2003 | Dinel |
| 6,682,578 B1 | 1/2004 | Sower |
| 6,716,360 B1 | 4/2004 | Titmas |
| 6,790,349 B1 | 9/2004 | Sawyer |
| 6,923,004 B1 * | 8/2005 | Chandran et al. ............. 60/781 |
| 6,944,967 B1 * | 9/2005 | Staples ........................ 34/183 |
| 2002/0122850 A1 | 9/2002 | Kartchner |
| 2003/0038078 A1 | 2/2003 | Stamper et al. |
| 2003/0089151 A1 | 5/2003 | Logan et al. |
| 2003/0098227 A1 | 5/2003 | Okamoto et al. |
| 2003/0111410 A1 | 6/2003 | Branson |
| 2003/0136165 A1 | 7/2003 | Logan et al. |
| 2004/0025715 A1 | 2/2004 | Bonde et al. |
| 2004/0040174 A1 | 3/2004 | Childs |
| 2004/0055716 A1 | 3/2004 | Landalv et al. |
| 2004/0087011 A1 | 5/2004 | Dvorak |

OTHER PUBLICATIONS

"From Feather to Feed Gas-Fired Flashdryers Create Profitable By-Products from Once-Costly Wastes", Industrial Processing, Natural Gus Applications in Business & Industry, pp. A2-A4.

* cited by examiner

PROCESS AND APPARATUS FOR MANUFACTURE OF FERTILIZER PRODUCTS FROM MANURE AND SEWAGE

FIELD OF THE INVENTION

This invention relates to processes and equipment for economically converting manure and sewage into fertilizer (particularly certified organic fertilizer) and soil builder products with high organic matter content (also certified organic) for agronomic uses.

BACKGROUND OF THE INVENTION

The number and size of concentrated animal feeding and other agricultural operations, which produce beef, pork, poultry, elk and other game animals, goat, lamb, fish, milk, cheese, eggs and other foodstuffs produced from animals, have been steadily increasing for the past 50 years. The same is true for other animal feeding operations for sheep, mink, alpaca and other animals for production of wool, furs and other fiber products. The primary benefit of housing and feeding larger numbers of agricultural animals at a single site is that the consolidated operations give an economy of scale that lowers per unit product operating costs and improves profitability. However, as the number and size of concentrated, confined animal feeding operations has grown over the years, the development of technology to treat the waste material from these facilities has seriously lagged. The majority of the waste material is transported to sites distant from these facilities and is applied with little or no treatment to land where food crops are grown. Consequently, there are environmental and health concerns about direct application of raw or minimally treated manure to the ground, including rainwater runoff of pollutants into surface and ground waters and emissions of greenhouse gases to the atmosphere due to bioconversion or decomposition. Disposal of manure is a significant cost to the animal feeding operation, because manure is produced in high volumes with high moisture content.

Chicken egg production in the United States has undergone significant change in recent years. Such change is characterized by growth of the producing flock, and individual producing sites have become larger. For example, it is estimated that there are currently more than 50 egg production facilities in the United States which contain a minimum of one million laying hens. Producers have been faced with the fact that egg production and processing operations must become large and more concentrated to improve economic performance in a competitive business environment. However, these major producing facilities with more than one million layers, typically do not use any type of manure processing technology, but simply apply the manure to farm ground as a method of disposal. As mentioned above, there are significant environmental concerns with this method of disposing of manure generated by the egg producing operation.

Animal manures from dairy, feed lot and hog facilities typically have a moisture content in excess of 70% by weight, which makes it difficult to handle and dispose of such manures economically. Removing moisture for volume reduction to enable landfill disposal is too costly and is environmentally undesirable. Transport to farm sites for direct disposal and use on crop land is also costly and is environmentally undesirable due to noxious odors released on application and due to the presence of contaminants, such as antibiotics, hormones, pesticides, etc., in the manure. In some cases, the application of raw or concentrated raw manure could cause plant kill in some applications due to such contaminants.

Bioconversion, commonly used for treatment of municipal sewage and livestock waste, refers to the conversion or decomposition of organic materials (such as organic waste) into useful products (such as usable feed or fuel) by bacterial decomposition of such organic matter. Bioconversion includes anaerobic and aerobic digestion. In some cases, operators of animal feeding operations have constructed lagoons and holding ponds to hold manure and to allow bioconversion digestion of the waste material before it is applied to the land. However, the condition and operation of some of these lagoons has been the subject of national news headlines, such as the breach of lagoon dikes in North Carolina, Iowa and elsewhere when flooding occurs. They also have the problems of requiring large land areas, and they have no control of emissions of noxious odors and greenhouse or polluting gases into the atmosphere.

While research by universities and government laboratories has shown that animal manure may, under certain controlled conditions, be effectively treated by anaerobic digestion, poultry and swine manure have been shown to be among the most difficult to treat. Conventional anaerobic digestion technology has certain limitations in terms of slow reaction rates (low throughput), particularly in cold climates, and the ability of the bacteria to be productive when conditions (such as pH, temperature and concentration of certain chemical constituents) in the digester are not optimum. Current literature teaches that anaerobic treatment of poultry manure can only be accomplished if the manure is diluted with water at a weight ratio of between about 4 to 1 and about 10 to 1 water to solids. While such dilution allows for better bioconversion and digestion of the manure, it also increases the volume of waste that must be handled and ultimately processed for disposal. As a result, this approach increases processing costs and is not economically desirable.

In spite of the efforts of governments and the animal feeding industry, there are no cost effective manure treatment facilities in operation that are not a significant and direct financial burden to the agricultural producer. In addition, the processes in use, such as biogas production from manure, themselves have environmental problems, such as producing a biodigested toxic sludge that must be disposed of in an acceptable manner. Therefore, new and improved methods of treating agricultural manure that overcome the technical defects and economic disadvantages of the prior art are highly desired.

A similar situation exists for municipal sewage due to rapid growth of cities and inadequate building or upgrading of sewage treatment facilities to keep up with the population growth. Aerobic digestion is commonly used for bioconversion of municipal waste, which also produces large volumes of dilute, high water, low solids, content mixtures that are costly to dispose of. In many countries a municipal sludge is produced by raising the solids content, and the resulting municipal sludge is disposed of by application to cropland. This is less common in the U.S. and Canada, and in some cases, is prohibited, so the sludge has been disposed of in landfill locations. However, due to federal, state and local government restrictions on the volume of waste permitted in landfill operations and the increasing fees for landfill disposal, the emphasis of technology in recent years has been on volume reduction of municipal waste by drying, incineration, etc., to reduce the cost of disposal of remaining solids in landfills. Incineration and pyrolysis are increasingly disfavored due to air pollution and solids disposal problems. Again, new and improved methods of treating municipal waste and sludge to overcome the technical and economic disadvantages of the prior art are highly desired.

Various rules and regulations have been developed for the purpose of sterilizing or decontaminating biological sludges, manures and wastes. In 1993 the U.S. Environmental Protection Agency promulgated rules for the treatment and management of municipal sewage sludge (EPA, 1993). These rules set standards for pathogen destruction (disinfection), vector attraction reduction (VAR), and metal contaminant reduction in sewage sludge. The disinfection standards are separated into two categories: Class B in which sludges are treated to partially destroy pathogens; and Class A where pathogenic bacteria, enteric viruses and helminth parasites are reduced to near detection limits.

Processes previously approved by EPA as Class A disinfection processes include: thermal treatment, based on a prescribed time-temperature relationship; advanced alkaline stabilization with accelerated drying, combining raising a pH above 12 for 72 hours, heating to greater than 125° F. for 12 hours, and producing solids greater than 50%; composting; heat drying; heat treatment of liquid sludge; thermophilic aerobic digestion; beta ray irradiation; gamma ray irradiation; pasteurization (temperature greater than 158° F. for at least 30 minutes); a combination of a pH reaching at least 12 and pasteurization; and several advanced digestion processes (EPA, 1999). Processes that purport to meet these EPA standards are costly in operation and typically do not provide satisfactory results.

Examples of the prior art and publications that have addressed the above problems by digestion, incineration, volume reduction and/or decomposition are U.S. Pat. No. 5,535,528 to Finham, U.S. Pat. No. 5,685,153 to Dickenson et al.; U.S. Pat. No. 6,039,774 to McMullen et al.; U.S. Pat. Nos. 6,125,633 and 6,173,508 to Strohmeyer; U.S. Pat. No. 6,171,499 to Bouchalat; U.S. Pat. No. 6,524,632 to Kartchner; U.S. Pat. No. 6,613,562 to Dvork; U.S. Pat. No. 6,682,578 to Sower; and U.S. Patent Application 2004/0025715 by Bonde et al., the disclosures of which are incorporated herein by reference in their entirety.

Another problem existing in animal feeding operations and sewage treatment is air pollution, including greenhouse gas emissions, including methane and $CO_2$, and gases having noxious odors. As residential housing areas have expanded, many have encroached on land adjacent to animal feeding operations, then complaints from residents regarding the noxious odors escalate. In addition to the odors and air polluting greenhouse gases produced from the manure and bioconversion of manure, significant quantities of the noxious and greenhouse gases are produced directly from the animals in their flatulence, burps and regurgitation. In addition to the need to control noxious and greenhouse gases emitted directly from the manure (urine and feces) or from decomposition of the manure, there is a recognized need to control the noxious and greenhouse gas emissions from the animals themselves and prevent same from being released into the atmosphere.

There is also increasing emphasis in developed countries on the production of food crops by use of certified organic crop production processes and materials. The governments of Canada, Australia, the United States, the European Union and other countries have developed standards for qualifying food products as "organic" or "organically produced," and several certifying organizations and government agencies exist to certify farms and market produce as "organic" under the appropriate standards. The concept underpinning "organic" food and crop production is that the inputs used in crop or animal production (fertilizer, seeds, feeds, sprays, etc.) are allowed to contain only minimal levels of certain approved non-natural materials, such as synthetic chemical fertilizers, genetically modified organisms, etc., and are allowed to contain essentially no amounts of designated undesirable materials, such as pesticides, drugs, growth hormones, pathogens, etc. The following are examples of the standards setting agencies:

CGSB—Canadian General Standards Board
Standards Council of Canada
270 Albert Street, Suite 200
Ottawa, Ontario K1P 6N7, Canada
NOSB/NOP—National Organic Standards Board/National Organics Program
U.S. Department of Agriculture
1400 Independence Avenue, SW
Washington, D.C. 20250 USA
CAAQ—Conseil des appellations agroalimentaires du Québec
35, rue de Port-Royal Est, 2ème étage
Montréal, QC, H3L 3T1 Canada
The Council of European Communities
Rue de la Loi/Wetstraat, 175
B-1048 Brussels, Belgium
IFOAM
Charles-de-Gaulle-Str. 5
53113 Bonn—Germany
CODEX Alimentarius Commission
FAO—Food and Agriculture Organization of the United Nations
Viale delle Terme di Caracalla
0100 Rome, Italy
FSANZ—Food Standards Australia New Zealand
Boeing House
55 Blackall Street
BARON ACT 2600
PO Box 7186
Can berra BC ACT 2610 Australia
JAS—Japan Agricultural Standards
Japanese Ministry of Agriculture, Forestry and Fisheries
Tokyo Center for Quality Control and Consumers Servic
Omiya City, Japan
COABC—The Certified Organic Association of British Columbia
8-A 100 Kalamalka Lake Road
Vernon BC, V1T 9G1 Canada
OMRI—The Organic Materials Review Institute
PO box 11558
Eugene, Oreg. 97440-3758, USA The following are examples of the organizations that have been qualified and accepted by at least one standards setting agency for certifying that specific producers/produce are in compliance with the applicable organic standards:
FVOPA—Fraser Valley Organic Producers Association
Surrey (CB), Canada
GBE Garantie Bio—Ecocert
Lèvis (Quebec), Canada
FOG—Florida Certified Organic Growers & Consumers, Inc.
Gainesville, Fla. USA
ACO—Australian Certified Organic P/L
Toowoomba, Australia
QAI—Quality Assurance International
12526 High Bluff Dr., Suite 300, San Diego, Calif. 92130 USA OCIA International—Organic Crop Improvement Association International
6400 Cornhusker Hwy, Suite 125, Lincoln, Nebr. 68507 USA
IOAS—The International Organic Accreditation Service
118½-1$^{st}$ Ave., South, Suite 15, Jamestown, N. Dak. 58401 USA
ICS—International Certification Services, Inc.
301 5$^{th}$ Ave. SE
Medina, N. Dak. USA
ICS/FVO—International Certification Services, Inc.
Farm Verified Organic
301 5$^{th}$ Ave. SE
Medina, N. Dak. USA
CCOF—California Certified Organic Farmers Inc.
Santa Cruz, Calif. USA
CERTIMEX—Certificadora Mexicana de Productos y Proceso Ecologicos S.C.
Oaxaca, Mexico
IMO—Institut flir Marktokologie
Weinfelden, Switzerland
SACL—Soil Association Certification Ltd.
Bristol, United Kingdom These standard setting organizations and agencies have been developed due to the rapidly increasing consumer demand, not only for organic products, but for some reliable standards so consumers can have confidence in the organic product labeling. Thus, the "certified organic" labeling and terminology have been developed to mean products or produce certified by recognized organizations as meeting the applicable agency standards and product or produce made by methods that meet the agency standards for organic production methods.

One essential aspect of certified organic food production is the necessity of using inputs that are certified organic, such as fertilizers, which are either approved, such as materials containing no pathogens or other disqualifying components, or regulated and accepted, such as manures, composts and the like that meet the applicable standards. Technology developed to date for producing certified organic fertilizer products has not been satisfactory due to one or more problems in product quality, environmental acceptability or economic feasibility for providing a reasonably priced commercial product. Examples of the prior art and publications that have addressed the production of organic or certified organic fertilizer products are U.S. Pat. No. 5,354,349 to Inoue; U.S. Pat. No. 6,461,399 to Connell; U.S. Pat. No. 6,517,600 and U.S. Pat. No. 6,645,267 to Dinel; U.S. Patent Applications 2003/0038078 by Stamper et al., 2003/0089151 and 2003/0136165 by Logan et al., and 2003/0111410 by Branson, the disclosures of which are incorporated herein by reference in their entirety.

It is apparent from the above that there is a substantial unmet need for environmentally and economically acceptable technologies for disposal of manure and sewage, for control of noxious and greenhouse gases from animal feeding operations, and for production of organic fertilizer and soil builder products that can be certified for food production inputs under established standards for certified organic food production. The present invention is directed to methods, apparatus, systems and products for meeting one or all of these needs.

SUMMARY OF THE INVENTION

The present invention provides economical and simplified methods, systems and apparatus for converting manure feedstocks to fertilizer and soil builder products, preferably conversion to certified organic fertilizer and soil builder products. The present invention further provides economical and simplified methods, systems and apparatus for controlling and containing noxious, odoriferous and greenhouse gases from animal feeding operations.

In one aspect, this invention provides a method for producing an organic fertilizer product from manure feedstock comprising operating a gas turbine generator to produce electricity and exhaust gases; contacting the exhaust gases with the manure feedstock having a moisture content of at least about 30% by weight in a dryer vessel for a contact time sufficient to produce, without significant oxidation of the manure feedstock, a dried fertilizer material having a moisture content less than about 20% by weight; and processing and forming the fertilizer material into a granular, pellet or prill form of fertilizer product suitable for conventional dry fertilizer application in a crop growing operation.

In another aspect, this invention provides a method for producing a fertilizer material from manure feedstock comprising operating a gas turbine generator to produce electricity and exhaust gases having a temperature greater than 1,000° F.; contacting the exhaust gases having a temperature greater than 1,000° F. with manure feedstock having a moisture content of at least about 30% by weight in a dryer vessel for a contact time sufficient to produce, without significant oxidation of the manure feedstock, a dried fertilizer material having a moisture content of less than about 20% by weight, and optionally provides a method further comprising the steps of granulating, pelletizing or prilling the fertilizer material to produce a fertilizer product suitable for conventional dry fertilizer application in a crop growing operation.

In another aspect, this invention provides apparatus for drying and/or converting manure feedstock to produce a fertilizer and/or soil builder material comprising a gas turbine in combination with a dryer vessel adapted for receiving manure feedstock and for receiving the exhaust gases from the gas turbine through a connection; wherein the connection between the gas turbine and the dryer vessel is adapted to substantially preclude the introduction of air into the dryer vessel and optionally provides the dryer vessel adapted for such drying and/or converting the manure feedstock by direct contact of the exhaust gases and the manure feedstock.

In another aspect, this invention provides a portable system for processing manure feedstock to produce a fertilizer product comprising at least one portable dryer unit adapted for drying a manure feedstock to produce a fertilizer material and at least one portable processing unit adapted for converting the fertilizer material from the dryer unit into a fertilizer product having a form suitable for conventional fertilizer application in a crop growing operation, and optionally further provides such a portable system wherein the dryer unit comprises a gas turbine and a dryer vessel. Further, the invention optionally provides such a portable system wherein the gas turbine and dryer vessel are connected by an arrangement adapted to pass the gas turbine exhaust gases into the dryer vessel and to preclude the introduction of air into the dryer vessel.

In another aspect, this invention provides the above portable system comprising a first skid-mounted unit comprising the gas turbine generator adapted for producing electricity; and a second skid-mounted unit comprising the dryer vessel adapted for connection to the gas turbine to receive the gas turbine exhaust gases and to preclude the introduction of air into the dryer vessel. Optionally a third skid-mounted unit is provided comprising the processing unit. Preferably the portable systems of this invention comprise rail-mounted, truck-mounted or semitrailer-mounted units. In another aspect, this invention provides the portable system, comprising the gas turbine and dryer vessel, plus an optional processing unit, configured and sized for a single skid-mount or truck-mount installation. Another optional aspect comprises an enclosure or enclosures for the portable units, primarily for operating noise attenuation.

In another aspect, this invention provides an organic fertilizer material comprising a manure feedstock thermally treated at sufficient temperatures and without significant oxidation for a sufficient period of time to destroy or convert to harmless forms substantially all undesired components present in the manure feedstock which comprise undesired organisms, microorganisms, pesticides, antibiotics, hormones, prions or viruses. Preferably the organic fertilizer material contains less than detectable levels of each such undesired component not so destroyed or converted, and optionally further provides such fertilizer material in the form of a fertilizer product suitable for conventional dry fertilizer application in a crop growing operation. This invention further provides a fertilizer material or product comprising thermally treated manure feedstock which contains $NO_x$, $SO_x$ or $CO_x$ components absorbed or complexed therein as a result of contact of the manure feedstock with gas turbine exhaust gases in a confined space in the absence of significant oxidation of the manure feedstock. Depending on the relative nutrient content and organic matter content of the manure feedstock, this aspect of the invention is equally useful for providing a high organic matter content soil builder product having similar characteristics.

In another aspect, this invention provides a fertilizer material or product comprising a manure feedstock thermally treated at sufficient temperatures without significant oxidation and for sufficient period of time to provide a self-binding fertilizer material or product suitable for conventional dry fertilizer application in a crop growing operation.

In another aspect, this invention provides a method for producing a soil builder product from a bioconverted manure feedstock comprising operating a gas turbine generator to produce electricity and exhaust gases, contacting the exhaust gases with the manure feedstock having a moisture content of at least about 30% by weight in a dryer vessel for a contact time sufficient to produce, without significant oxidation of the manure feedstock, a dried soil conditioner material having a moisture content less than about 20% by weight and optionally processing and forming the soil conditioner material into a granular, pellet or prill form of soil conditioner product suitable for conventional dry application to the soil.

In another aspect, this invention provides a system for processing animal gases and noxious or odoriferous odors or gases from manure feedstock comprising a gas turbine having a combustion air intake and an animal shelter having ventilation air exhausted from the shelter, wherein the combustion air intake is adapted to receive at least a portion of, and preferably substantially all of the ventilation air exhausted from the animal shelter. The gas turbine can optionally comprise a gas turbine generator and can optionally include a dryer vessel adapted for receiving the gas turbine exhaust and for receiving and treating manure feedstock. In an alternative aspect, this invention provides said systems for processing animal gases and noxious or odoriferous odors or gases through the combustion air intake of a reciprocating engine, which can optionally include an electric generator and can optionally include a dryer vessel adapted for receiving the engine exhaust.

In another aspect, this invention provides apparatus for treating manure feedstock comprising a gas turbine having a combustion air intake adapted to receive ventilation air from an animal shelter, a dryer vessel having a connection adapted for receiving exhaust gases from the gas turbine and having an inlet for receiving manure feedstock. Optionally the combustion air intake can be adapted for connection to the animal shelter ventilation system whereby the combustion air intake receives substantially all the ventilation air exhausted from the animal shelter. Additionally in this aspect, the connection between the dryer vessel and the gas turbine exhaust can be adapted to substantially preclude the introduction of air into the dryer vessel.

The above aspects and other aspects will be apparent to one skilled in the art from the disclosure herein.

DESCRIPTION OF THE INVENTION

Figure 1:
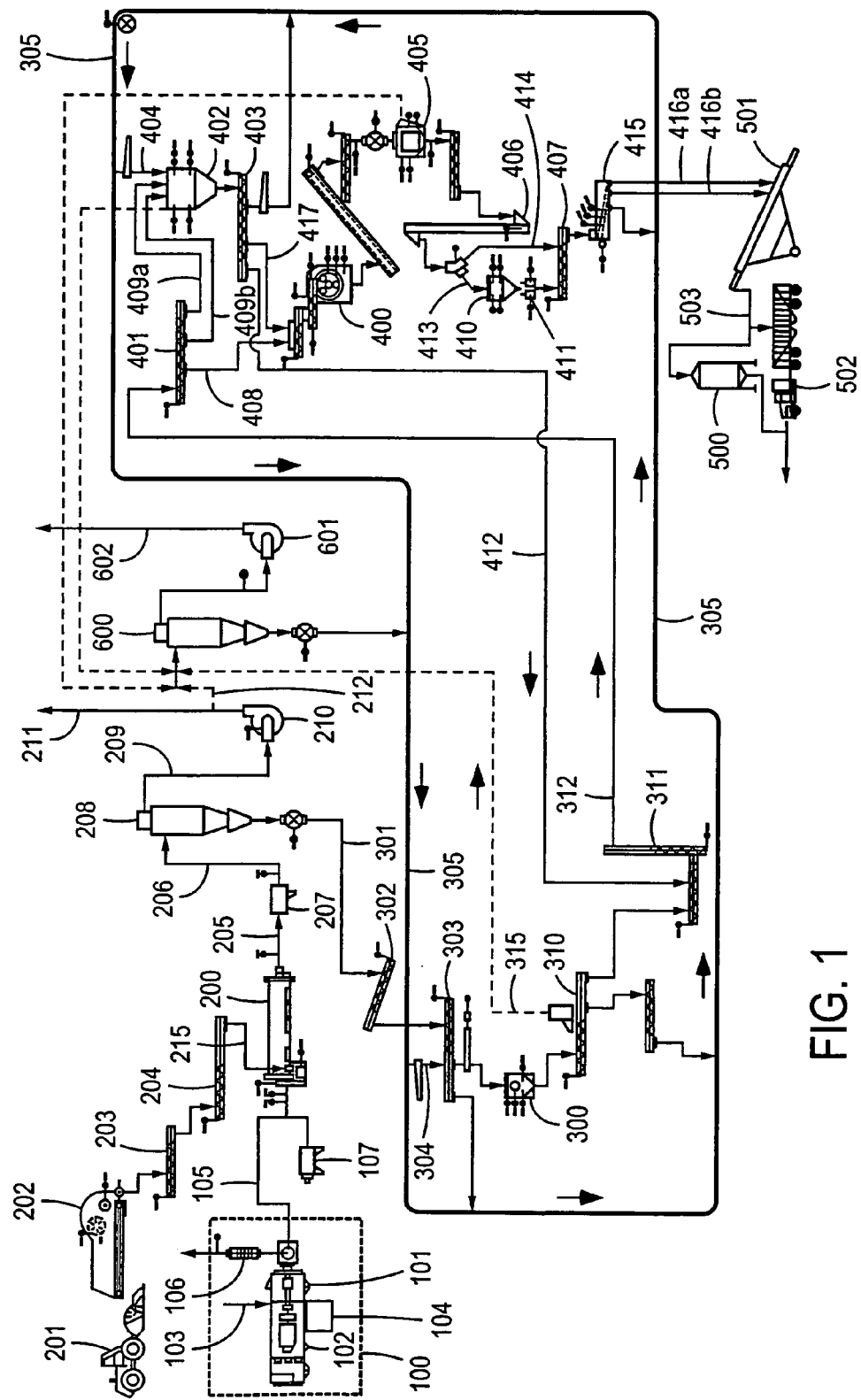
FIG. 1 is a schematic diagram of a process for treating manure feedstock using the process and equipment in accordance with the present invention.

This invention provides an economical, efficient and simplified solution to the increasingly severe problem of environmental pollution caused by manure and gases from livestock operations and by sewage from municipalities. Prior art methods and systems provided to date either are not sufficiently effective in conversion of such manure and gases to a safe, environmentally acceptable form or are not adaptable to be economically feasible for small as well as large commercial operations. Other problems exist with many of the prior art systems, such as uneconomical to operate, failure to decontaminate and failure to prevent air pollution (or in fact causing additional environmental problems in the operation of the process).

Examples of the prior systems and their deficiencies include the following. Digestion processes, whether aerobic or anaerobic, are slow, inefficient and produce a sludge that must be disposed of, typically in a landfill or land spreading. Digestion or composting systems designed to produce biogas, typically methane, for fuel do not provide economically beneficial fuel production and are costly to operate, because the fuel produced is not produced at a sufficient rate, is not of sufficient thermal value for economic operation. It is a "dirty" fuel in that it produces environmentally unacceptable emissions when burned and is difficult to burn efficiently due to its variable content. This variable and inconsistent content of contaminants and fuel value can actually damage some systems, such as gas turbines and reciprocating engines, due to corrosion or uncontrollable burning conditions. Digestion and composting systems designed to produce fertilizer or soil conditioner products have the drawback that such products produced are not free of biologic or chemical contaminants that are undesirable or prohibited for use on crop land, particularly for certified organic uses, and such products are too low in nutrient value to serve as an effective fertilizer. Biogas production operations produce a depleted sludge that is costly to dispose of in an environmentally acceptable way.

Treatment systems that employ heat and chemical treatment are inefficient and frequently ineffective in producing a safe final product. These include pH adjustment and chemical additives, usually with heating to help kill organisms present. Some heat treatment systems employ pressure (for higher temperature cooking), microwave heating, radiation and other supplemental treatments, which only serve to add to the cost of operation with diminishing benefit in product quality or environmental cleanup. In many cases the additional complexity of treatments and combinations of process steps results in more negative environmental impact from the resources employed and byproducts produced than is achieved in beneficial environmental impact from the total treatment. Many systems produce alternative or additional byproducts that are contaminated or cause collateral environmental pollution in their operation. Systems that involve incineration, partial incineration, gasification or pyrolysis are similarly inefficient and not sufficiently effective, because incineration produces additional effluents that must be contained to prevent alternate or additional air pollution. Also, while incineration systems produce a product that may be sufficiently sterilized, the product may contain other undesirable byproducts of the incineration making it unsuitable for some fertilizer uses, thus requiring undesirable disposal in landfill. And, incineration systems carry the additional risk of potentially uncontrollable or flash fires, which at a minimum damages the processing equipment and at worst poses safety issues.

Prior art systems have not satisfactorily addressed the problem of noxious gases and greenhouse gases that are produced in animal feeding operations and municipal sewage treatment operations. Sources of such gases are the animals themselves, the manure and waste from the animals and the bioconversion or decomposition of the manure, sewage and waste. These gases are typically vented or released to the atmosphere, but are objectionable to nearby residents due to the noxious odors and are environmentally objectionable due to the atmospheric pollution caused by the greenhouse gases contained therein, particularly methane.

The present invention provides new technology in the form of processes, apparatus and systems for conversion of manure feedstock to useful, environmentally acceptable materials and products, which in one preferred aspect can be produced in a form suitable for use in certified organic agricultural operations. As disclosed herein, the present invention provides technology which reduces or eliminates the undesirable environmental impacts of greenhouse gases produced in animal feeding operations, and the technology of this invention also reduces or eliminates the undesirable environmental impacts of manure feedstock treatment compared to the prior art processes and systems. One of the major advantages of the present invention resides in the aspect that in most manure feedstock processing all waste solids are contained and become part of the final product useful as a fertilizer or soil builder material. Thus, the present invention can completely eliminate the necessity of disposing of any remaining sludge or other solids in a landfill or by land spreading.

The term "manure feedstock" is used herein to mean and include waste matter excreted from animals as feces and/or urine, such as but not limited to human (municipal sewage or sludge), cattle (beef, dairy, buffalo, veal, etc.), horses, sheep, swine, poultry (chicken, turkey, ostrich, pigeon, etc.), goat, mink, veterinarian, stockyard, stable, race track, rodeo grounds, fairgrounds, feedlot, sale barn, zoo, aquatic (fish, shrimp, etc.), elk (and other game), llama, alpaca, as well as other operations and sources of sewage or manure, and any mixtures thereof. Manure feedstock as used herein includes such matter along with other materials normally present in agricultural operations where such matter is produced, such as straw, bedding (which is typically shredded paper, wood chips, etc.), hair, feathers, insects, rodents, etc., whether the ratio of such matter to such other materials ranges from very low to very high. Manure feedstock as used herein includes such matter in its raw form, any prepared form and mixtures thereof with other materials such as other bio matter (yard waste, green waste, etc.), additives, process aids, bone meal, fish meal and the like, including where the matter is fresh, fully bioconverted by composting, digestion, etc., or is at any stage in between. It will be recognized that, when other components, such as bone meal, etc., are added to, mixed with or included in the manure feedstock for processing according to this invention, such additional components will also benefit from the thermal destruction or conversion of the undesirable components listed above, such as prions, etc., just as the manure feedstock does. Thus, it may be desirable to mix contaminated materials, such as straw containing pesticides, bone meal containing prions, etc., with the manure to be processed, so that those contaminants can be converted or destroyed during the processing of the manure feedstock according to this invention. This invention is useful in processing other types of waste products and waste streams, as disclosed in commonly assigned copending U.S. patent application Ser. No. 10/895,030, filed on Jul. 19, 2004, the disclosure of which is incorporated herein by reference in its entirety.

The present invention provides a simplified, economically efficient alternative to the prior art and provides in its preferred aspects, a product 100% usable as fertilizer and/or soil builder products, and which provides 100% conversion of manure feedstock solids to useful products, which eliminates the problem unsolved by the prior art of disposal of solids left over from various manure feedstock treatments, such as composting and biogas production. In a preferred aspect of this invention, the fertilizer produced is an organic fertilizer usable by certified organic food producers without jeopardizing their certified organic product status. According to the present invention, the nutrient value of fertilizer produced from a manure feedstock can be maximized if composting, digestion, incineration and oxidation of the manure feedstock are avoided or at least minimized. In this invention, the high temperature treatment of manure feedstock, preferably by direct contact with hot gases, e.g., >1,000° F., destroys or converts to harmless forms substantially all undesirable components present in the manure feedstock, including organisms, microorganisms (including genetically modified organisms, bacteria, pathogens and other microorganisms), seeds, pesticides, antibiotics, hormones, prions and viruses, particularly when such heat treatment takes place for a sufficient time and without significant oxidation, incineration or pyrolysis of the manure feedstock. The treatment at sufficiently high temperatures for a sufficient amount of time in the absence of significant oxidation and/or pyrolysis "cooks" or otherwise converts or transforms the manure feedstock into a self-binding product, whereby it can be formed into conventional pellets, granules, prills or other forms, usually without the need for addition of binders or other agglomerating additives, which have sufficient physical hardness and strength to be formed into conventional shapes and sizes and to be used in conventional dry fertilizer application equipment and operations. This invention also provides for recovering and recycling the water removed from the manure feedstock, which water can be used for livestock water, irrigation or other industrial uses, and for recovering and recycling all solids (fines or other) produced in the process, so that there are no significant solid products produced other than the desired fertilizer and/or soil builder products suitable for commercial use.

According to this invention, a most efficient way of providing the hot gases for contact with the manure feedstock is the exhaust from a gas turbine, and preferably a gas turbine electric generator. According to the system of this invention, the gas turbine is fueled from locally available conventional fuel sources, because in the operation of this invention no bioconversion takes place and no biogas is generated from the manure feedstock, and because conventional fuels provide the most efficient, reliable and controllable operation of the gas turbine. The electricity produced from the gas turbine generator is preferably sold back into the local power grid as a revenue source for the operation of this invention, but it can be used internally in the operation of the system of this invention or in other nearby operations as a supplemental source of power or in a combination of uses for power and heat recovery from the processes employed in this invention. It is preferable and more efficient in the operation of this invention to merely sell the electric power produced to the local power grid. This enables varying the operation of the processes and equipment of this invention in the most efficient and effective manner for treatment of the manure feedstock to produce the desired quality of fertilizer or soil builder products without concern for or being constrained by any particular minimum or necessary level of electricity output.

One important feature of the process and apparatus of this invention is that the gas turbine and the manure feedstock dryer vessel receiving the exhaust gas from the gas turbine are connected together such that induction of outside air into the dryer vessel is precluded and the dryer vessel preferably receives the exhaust gases directly from the gas turbine. It is preferred that 100% of the gas turbine exhaust gases are passed into the dryer vessel and, for most efficient operation, preferably without passing through any intervening heat exchanger, silencer or other equipment in order that the dryer vessel receives the maximum heating from the gas turbine exhaust. But, it is recognized that excess exhaust gases not needed for the dryer vessel operation can be diverted to provide heat required in other steps in the systems of this invention or in other nearby operations. It is also preferred that the exhaust gases result from conventional and efficient combustion ratios in the gas turbine so that the exhaust gases contain minimum or limited amount of free oxygen, essentially no unburned fuel, no exposed flame and that the optimum exhaust gas temperature (EGT) is achieved, for maximum heat produced, per unit of fuel consumed. The combustion can also be at stoichiometric ratio for peak EGT operation at maximum temperature, and maximum heat input for the process. The absence of excess oxygen in the exhaust gases, precluding outside air induction into the dryer vessel, the absence of exposed flame and operation at the temperature set forth herein prevents significant oxidation of the manure feedstock in the dryer vessel, preserves the maximum nutrient value in the manure feedstock for containment in the end fertilizer product, prevents the danger of fire damage to the equipment and provides an operation safe from flash fires in the dryer vessel. The absence of excess fuel in the exhaust gases prevents the exhaust gases from being a source of hydrocarbons that must be scrubbed from the vapor effluent from the operation of this invention before being released into the atmosphere.

In the operation of the processes and apparatus of this invention, it is preferred that the manure feedstock be as fresh as possible with a high moisture content. In other words, the manure feedstock should have undergone no, or as little as practical, composting, digestion or other bioconversion prior to processing according to this invention. This provides the highest nutrient value and organic matter content in the produced fertilizer and soil builder product. This preferred aspect is efficiently achieved by a preferred design of the systems of the present invention, which is the modularization of the process units in skid-mounted or other form suitable for transport by truck. This enables the entire system of this invention to be sized appropriately and placed on-site at feedlots, chicken barns, hog farms, etc., and enables processing of the manure feedstock from such operations immediately after it is produced. This preferred system for such operations provides additional economic and environmental efficiency, because it eliminates the cost and environmental impact of transporting any manure feedstock or depleted sludge to a distant location for processing or disposal. Eliminating the necessity of transporting manure feedstock from one location to another also provides the benefit of biosecurity between facilities, i.e., it eliminates the transport and spread of harmful or undesirable plant and animal diseases. This design also enables custom or jobber manure feedstock processing where the truck mounted units are easily moved from one manure feedstock accumulation site to another, in order to maximize the utilization of the capital investment in the equipment employed for carrying out this invention. Such portability also enables full utilization of the equipment of this invention, which can be scaled to an appropriate size for efficient, economical operation, so it can be used on a part time basis at each of several different feed lots, hog farms, etc., in a particular area where a permanent installation at any single location is not needed or is not economically justifiable. The systems of this invention can also be scaled to appropriate size for an individual animal feeding operation to operate full time to continually process the manure continually produced in the operation, so that manure stockpile or excess manure at any time the feeding facility is in operation is minimized. Similarly, the systems of this invention can be sized for installation at office buildings, hospitals, hotels, etc., to intercept and process raw sewage therefrom to reduce the burden on municipal sewage treatment facilities. With many municipal sewage treatment facilities reaching full capacity and the cities being faced with major capital expenditures to build new or expanded facilities, this invention provides an economically attractive alternative by processing waste streams on site at large manufacturing facilities to produce a useful product and relieve the burden on the municipal sewage system. The systems of this invention can also be adapted to sanitarily treat, on site, raw sewage from office buildings, hospitals, hotels, etc., to produce, on site, a fertilizer product, thus further relieving the burden on the municipal sewage system. This aspect of the systems of this invention can be particularly useful at remote resort locations, where municipal sewage treatment facilities are not available, to process the sewage therefrom to produce a fertilizer product and eliminate the problems of sludge disposal.

For use in this invention, it is preferred that the manure feedstock have a high moisture content, such as at least 30% by weight water, preferably at least 50% and most preferably at least 70%. The high water content facilitates mechanized handling of the raw material and preparing it for use by blending and mixing for uniformity of feedstock. Typically the manure feedstock is moved by augers, front end loaders, back hoes, conveyor belts and the like, particularly in cattle and poultry operations. However, in some installations the manure feedstock may be prepared in the form of a pumpable slurry, particularly in dairy and swine operations, where barn cleaning may be done by water flooding and the water content of the manure feedstock may be as high as 90%, 95% or even 98%. Prior to this invention, such manure feedstocks could not be economically processed and were simply put in holding or settling ponds, or lagoons which have major air pollution, odor and environmental problems. The present invention efficiently and economically processes such high water content manure feedstocks to not only recover the manure content in the form of a high nutrient fertilizer, but to also recover the process water, which is decontaminated from pathogens, etc., and can be recycled for barn cleaning, for livestock drinking water or for crop irrigation. This invention can handle high water content manure feedstocks efficiently and economically due to the fact that excess steam produced in the dryer vessel can be used downstream, upstream or in other nearby operations, such as barn cleaning, preheating manure feedstock, greenhouse heating, etc. Instead of holding such high water content manure feedstocks in open ponds, this invention enables holding the manure in enclosures or tanks, which eliminates the air pollution, odor and environmental problems associated with open ponds. This invention contains and processes not only the water and solids but also the gases produced, as disclosed herein. As noted, it is preferred for this invention that the manure feedstock be as fresh as practical, having undergone as little bioconversion as possible, such as by composting or digestion. In some cases where manure must be held or stored before processing, it may be desirable to cool the manure feedstock at the source installation or a storage location, such as disclosed in EP 0677237 to Claesen, in order to minimize bioconversion before the manure is processed into fertilizer according to this invention. Minimizing the bioconversion, particularly by immediate processing according to this invention, with or without such cooling, has the added environmental benefit of reducing noxious or harmful emissions into the atmosphere and the economic benefit of eliminating or reducing the need for odor amelioration or emission control equipment at the agricultural operation. In some cases it may be desirable for economic operation reasons to mechanically separate part of the water from high-water content manures, e.g., by centrifuges, before processing the manure in the system of this invention. Such separated water can be recycled for use, such as in floor cleaning or for other process water requirements.

It is recognized that raw manure feedstock will typically contain other material such as straw, twine, wire, gravel, rocks, jute or plastic bags, etc. Such materials are processable as part of the manure feedstock in the present invention without detrimental effect, provided the levels of such other materials are not unusually high. However, it is normally preferred to separate out such materials, particularly rocks, wire and the like, that might damage the dryer vessel or downstream processing equipment. Otherwise, it may be desirable to prepare the manure feedstock by chopping, grinding or other preparation to comminute items such as twine, bags and the like into small pieces so they can be processed into the final fertilizer product without significant interference with the normal operation of the processes and apparatus of this invention or with the end use of the fertilizer product. It should be noted that such materials that are either inert or are biodegradable can be contained in the fertilizer product without detrimental effect, which may be particularly desired where it is not economically efficient to remove such materials from the manure feedstock or during processing according to this invention. The manure feedstock preparation by grinding, chipping, chopping, crushing, etc., not only will improve the uniformity of the feedstock for processing, but will also facilitate addition of other materials into the feedstock, such as straw, woodchips, yard waste, etc., as referred to above. In addition the manure feedstock preparation can include a washing step, which may be useful in very dry manure, such as poultry, or to remove excess salt content that may not be desired in a final fertilizer or soil builder product.

While it is preferred that the manure feedstock has undergone no or little bioconversion by composting, digestion, etc., it is recognized that this invention is equally useful in drying and processing fully bioconverted (composted or digested to exhaustion) manure feedstock to produce a useful material or product. The fertilizer nutrient value of such a material or product may be minimal but the material or product may be useful as a soil conditioner. The term "bioconverted manure feedstock" as used herein is intended to mean a feedstock in which a sufficient portion of the nutrients therein have been converted by composting, digestion, etc., to render the feedstock more suitable for production of a soil conditioner or soil builder product than for production of a fertilizer product. It will also be recognized that the manure feedstock useful in this invention include those where the actual animal waste (feces and/or urine) is a small percentage of the manure feedstock with the remainder being other materials, such as straw, bedding, etc. For example, in some chicken feeding operations, shredded paper is used for nesting/bedding material and it is changed often enough that the manure feedstock from such operations may be a low percentage by weight, such as about 10% to about 30% waste, and about 50% to about 80% other material with the remaining 10% to 20% being water. Even such manure feedstock is advantageously processed by this invention to produce a soil builder and/or fertilizer products.

The term "gas turbine" is used herein to mean and include any turbine engine having a compressor turbine stage, a combustion zone and an exhaust turbine stage that is capable of producing exhaust gas temperatures of at least 500° F., preferably at least about 700° F., more preferably at least about 900° F. and most preferably greater than about 1,000° F. Gas turbines are the heat source preferred for use in this invention because of their efficient operation and high heat output. The gas turbine generator is further preferred for use in this invention due to the production of energy by the generator, which energy can be utilized or sold to improve the economics of the operation of the system of this invention. The generator will typically be an electric generator due to the convenience of using and/or selling the electricity produced. However, the generator can be any other type of energy generator desired, such as a hydraulic pump or power pack that can drive hydraulic motors on pumps, augers, conveyors and other types of equipment in the system of this invention or equipment in other nearby operations. The heat requirements and the system economics will determine whether a gas turbine or gas turbine generator is used. If it is desired to have higher temperature exhaust gases and higher heat output from a given smaller size gas turbine, it may be desired to use a gas turbine instead of a similar size gas turbine generator. Compared to the gas turbine, the gas turbine generator further expands and cools the exhaust gases in absorbing energy to drive the generator, where in a gas turbine that energy is contained in higher temperature gases available for use in the dryer vessel of this invention. This can be an option when it is economically more important in the practice of this invention to have small (truckable) high temperature units than to have the revenue stream or economic benefit of the electricity or other energy production by the gas turbine.

The gas turbine or gas turbine generator useful in this invention can be fueled from any available source with any suitable fuel for the particular gas turbine and for the process equipment designed according to this invention. The preferred and conventional fuels are sweet natural gas, diesel, kerosene and jet fuel because the gas turbines are designed to run most efficiently on good quality fuels of these types and because of their common availability, particularly at remote agricultural operations, where the units of this invention are often most efficiently located. However, other fuels that can be used to fuel the gas turbine include methane, propane, butane, hydrogen and biogas and bioliquid fuels (such as methane, oils, diesel and ethanol). Since the system of this invention does not produce a biofuel, the fuel for the gas turbine used in this invention must be available at the local site where this invention is utilized. If fuel is not available locally, a fuel such as diesel can be trucked to the site as needed.

Examples of commercially available gas turbines and gas turbine generators useful in the present invention include the following (rated megawatt (MW) outputs are approximate):
  Rolls Royce Gas Turbine Engines Allison 501-KB5, -KB5S or -KB7 having a standard condition rated output of 3.9 MW
  European Gas Turbines Tornado having rated output of 7.0 MW
  Solar Mars 90 having rated output of 9.4 MW and Solar Mars 100 having rated output of 10.7 MW
  Solar Tarus 60 having rated output of 5.5 MW and Solar Tarus 70 having rated output of 7.5 MW For a nominal product output capacity of 2.5 metric tons/hr. (2,500 kg/hr) a gas turbine generator size of about 4 MW can be used, depending on the heat insulation and heat recovery efficiencies designed into the overall system. For small single semitrailer or truck systems, the units may be scaled smaller. For smaller product output systems, such as an 0.3 metric ton/hr product output, small gas turbines, such as Solar Saturn 0.8 MW, Solar Spartan 0.2 MW or Capstone 0.5 MW or 0.3 MW generators, can be used depending on system efficiencies and required heat input ranges. It will be recognized that systems according to this invention can also be designed to utilize the exhaust gas heat from reciprocating engines, such as gasoline or diesel generators. Such small systems can be used at temporary sites, such as rodeo grounds, to provide electricity, clean up the fresh and old manure and produce a fertilizer product.

The dryer vessel employed in this invention can be any type or configuration that is suitable for drying the manure feedstock available and that can be adapted for receiving the gas turbine exhaust gases and receiving the manure feedstock without allowing a significant amount of outside air to enter the drying chamber in the dryer vessel where the exhaust gases contact the manure feedstock. The objective of the design of the gas turbine exhaust connection to the dryer vessel for purposes of this invention is to preclude any significant outside air from entering the dryer vessel to help prevent significant oxidation of the manure feedstock. As previously pointed out, this is to preserve the organic matter, carbonaceous and/or nutrient values present in the manure feedstock, to prevent fires and to provide a safe operation. As used in this invention it is preferred and expected that the turbine will be operated at a conventional ratio of fuel to combustion air in order to produce the most efficient exhaust gas temperature (EGT) for the dryer vessel and to produce gases entering the dryer vessel that contain a minimum of free oxygen. It will be recognized by those skilled in the art from the disclosure of this invention, that alternate sources of hot gases other than a gas turbine can be used and connected to the dryer vessel, such as the exhaust from conventional oil or gas burners and reciprocating engines, provided they are operated at conventional combustion ratio conditions to minimize free oxygen, or at stoichiometric ratio for no free oxygen, in the exhaust and are connected to the dryer vessel in a fashion that precludes significant outside air from entering the dryer vessel in order to preclude significant oxidation of the feedstock. Of course, such an alternate and additional source of hot gases can optionally be connected to the dryer vessel according to this invention and be used to supplement the exhaust gases output of the gas turbine in order to provide additional heat input capacity for the dryer vessel if needed for start up, shut down or surge load conditions or for backup in the event the gas turbine goes off line.

It will be recognized in the operation of this invention, that not all outside air can be excluded and oxidation of the manure feedstock cannot be completely precluded, primarily because of the air present in and entrained in the manure feedstock, the air dissolved in the moisture present in the manure feedstock and excess oxygen that may be present in the turbine exhaust gases during periods that stoichiometric ratio of fuel and air is not achieved. In addition, in some cases oxygen may be produced or liberated from the organic or other materials present in the manure feedstock when the thermal treatment and conversion takes place and decomposes or converts such materials. Therefore, the terms as used herein which refer to "preclude introduction of air," "without significant oxidation," and the like, are used in the above operational context and with the recognition and intended meaning that the air or oxygen entering the system as part of the manure feedstock or exhaust gases or produced in the thermal conversion process is not intended to be precluded and that the oxidation that may occur as a result of that air entering the system with the manure feedstock is not intended to be prevented. However, such a level of oxidation is not considered significant within the scope, context and practice of this invention or the meanings of those terms as used herein. Similarly, "without significant pyrolysis" is used herein to mean that not more than an insignificant portion of the manure feedstock is pyrolized, e.g., as in U.S. Pat. No. 6,039,774. Pyrolysis products are undesirable in the processes and products of the present invention, and the processes and equipment of this invention are operated to achieve the desired drying of the manure feedstock and the desired conversion and destruction of various manure feedstock components, such as pesticides, prions, organisms, seeds, etc., but operated to avoid significant oxidation and preferably to avoid significant pyrolysis, or at least to minimize oxidation and minimize pyrolysis. Following the disclosures herein, it will be apparent to one skilled in the art to control the exhaust gas temperatures, the contact times and/or residence times in the dryer vessel, the moisture content of the solids and of the vapor phase in the dryer vessel and other variables in order to process a particular manure feedstock to achieve these desired results and to maximize the nutrient value in the final products.

Dry or low moisture content manure feedstock is likely to have more air entrained in the interstices among the particles than wet or high moisture content manure feedstock, and elimination of such entrained air from a dry manure feedstock before introduction into the dryer vessel may not normally be economically practical. However, consistent with other operational aspects of this invention, it is therefore preferable to use high moisture, low air content manure feedstock, and may be preferable to add water to a dry manure feedstock to displace air therefrom before processing in the systems of this invention. Minimizing introduction of air and oxygen into the dryer vessel is preferred to prevent significant oxidation of the nutrient components of the manure, as well as other components of the feedstock, such as straw, dust, etc., that might pose a fire or safety hazard if excess air or oxygen were present in the dryer vessel.

Exclusion of outside air is also preferred for economic efficiency as well, because heating excess or outside air along with heating the manure feedstock reduces the efficiency of the process. In some instances where the manure feedstock is very low in moisture content or too dry for preferred operation of this invention, water can be added to the feedstock, to the turbine exhaust, to the turbine intake or to the dryer vessel to raise the moisture level in the dryer vessel to a level for efficient operation and to produce a solids material from the dryer vessel with a desired moisture content and desired self-binding properties. Addition of water to a dry manure feedstock followed by mixing, kneading or pressing, such as in windrow mixing and pressing with a roller, can also serve to displace air from the feedstock before being introduced into the dryer vessel. In the case of very dry manure feedstocks, water may be considered a process aid added before entry into the dryer vessel.

It will be recognized that the operation of the dryer vessel is normally to dry the manure feedstock, but it is to also achieve the high temperature heating of the manure feedstock to convert or destroy undesired components and to achieve a chemical or thermal alteration in the feedstock to provide binding and particle hardness profiles desired in the final product. As noted, an important aspect of this invention is the thermal conversion of the various components of the manure feedstock without significant oxidation from the outside air. Since the specific components of manure feedstocks are numerous and varied, it is not clearly understood what specific chemical reactions may be taking place in the thermal conversions, and applicants do not wish to be bound by specific theories or speculation regarding same. However, certain observations have been made, and the understanding of the following observations will further enable one skilled in the art in effectively and efficiently practicing this invention.

First is the thermal conversion and destruction of undesirable components, such as organisms, chemicals, etc., as discussed elsewhere in this disclosure. Second is the thermal conversion, chemically or physically, of the organic matter (animal waste, straw, bedding, etc.) in the manure feedstock that makes it essentially self-binding and enables the thermally treated or converted feedstock to be made into high physical strength pellets, granules or prills without the addition of binders or similar materials. While conventional binders for forming pelletized, granulated or prilled fertilizers can be used in the practice of this invention, it is preferred to operate at thermal treatment temperatures and residence times to produce a material that is self-binding and can be pelletized/granulated/prilled without added binders. It is believed that to some extent, when the organic matter in the feedstock is chemically altered and/or thermally converted, similar to being "cooked," it transforms ligands, cellulose, starch, carbohydrates, etc., into materials that can act as binders in the final product. This provides a binding profile to enable formation of a final product having particle strengths and free flowing anticaking and nonfriable properties that make it useful in conventional dry fertilizer handling and application equipment. Manure feedstocks that range from very high to very low proportion of animal waste present can be converted to self-binding materials that will form good strength pellet, granule or prill products without additional binders added. Of course, additional binders may be added to enhance the strength properties of any of the final products of this invention, if desired. Further, some materials produced that are low in nutrient value but high in organic matter and are useful as soil conditioners or soil builders can similarly be processed to produce usable pellet, granule or prill products. Third is the recognition that in some operations of processing a very low moisture content manure feedstock, there may actually not be any significant drying taking place, i.e., the moisture content of the feedstock entering the dryer vessel may be essentially the same as the fertilizer or soil builder material exiting the dryer vessel, so the dryer vessel is essentially acting as an oven. In this case, the important processing taking place is the thermal treatment or conversion and/or chemical alteration ("cooking") of at least a portion of the organic matter present in the feedstock to enable the produced material to be sufficiently self-binding to provide a final pellet, granule or prill product having useful binding, agglomeration, hardness, anticaking, nonfriable, nondusting, free flowing and humidity tolerant profiles. Again, optional binders may be added to enhance the strength characteristics of the final product, if desired.

The types of dryer vessels that can be used in this invention are, for example, the following:

Rotary drum with or without internal scrapers, agitation plates and/or paddles

Stationary "porcupine" drum dryer with or without scrapers and/or agitator plates and/or paddles Triple pass stepped drying cylinder or rotary drum dryer systems with or without scrapers and/or agitator plates and/or paddles Rotary drum dryer systems with or without steam tubes and with or without scrapers and/or agitator plates and/or paddles Turbo-dryer or turbulizer systems Conveyor dryer systems with or without scrapers and/or agitator plates and/or paddles Indirect or direct contact dryer systems with or without scrapers and/or agitator plates and/or paddles Tray dryers Fluid bed dryers Evaporator systems Examples of commercially available dryer vessels useful in or that can be adapted for use in this invention include:

Scott AST Dryer™ Systems

Simon Dryer Ltd.—Drum dryers

Wyssmont Turbo Dryer systems

Duske Engineering Co., Inc.

Energy Unlimited drying systems

The Onix Corporation dehydration systems
International Technology Systems, Inc. direct or indirect dryer systems
Pulse Drying Systems, Inc.
MEC Company dryer systems Further examples of dryer vessels useful in or that can be adapted for use in this invention are disclosed in U.S. Pat. No. 5,746,006 to Duske et al. and U.S. Pat. Nos. 5,570,517 and 6, 367,163 to Luker, the disclosures of which are incorporated herein by reference in their entirety.

As noted above the "dryer vessel" does not necessarily always function primarily as a dryer by removing moisture from the manure feedstock in the system of this invention. The dryer vessel also functions as the thermal treatment/conversion/alteration vessel or oven in which the manure feedstock is heated to sufficient temperatures for sufficient times to produce the desired final materials and products as disclosed herein. In addition, the dryer vessel need not provide direct contact of the turbine exhaust gases or other heat source and the manure feedstock, but can provide indirect heating of the manure feedstock to achieve the drying and/or thermal treatment/conversion/alteration desired according to this invention. In either direct or indirect heating, the system is controlled so that no significant oxidation and no significant pyrolysis of the manure feedstock takes place.

Another aspect of the dryer vessel adapted for use in this invention is that the dryer vessel preferably also functions as the silencer or muffler for the gas turbine or other engine providing the hot exhaust gases. It is well known that gas turbines, (essentially jet aircraft engines), produce a high level of noise impact on the nearby environment. Stationary gas turbines used for electric power production or other purposes are usually required by local, state and federal regulations to have silencers installed to muffle the noise of the exhaust of the gas turbine to acceptable levels. Such silencers have the economic disadvantages of cost and creating back pressure on the gas turbine exhaust, which reduces the efficiency of the gas turbine operation. One advantage provided by this invention, due to the connection between the gas turbine exhaust and the dryer vessel being closed to outside air, is that the dryer vessel functions effectively as a silencer for the gas turbine. This is at least in part a result of the internal configuration construction of the dryer vessel acting in combination with the presence of the high water content manure feedstock, which combination is effective in absorbing and muffling the gas turbine exhaust noise. This is also due to the downstream end of the dryer also being closed to the atmosphere, because the steam and off gases from the dryer vessel are collected for condensation, cleaning, recycling and for heat recovery in the downstream processing in a closed system before being vented to the atmosphere. It will be apparent to one skilled in the art that capability for venting at various points in the process and the equipment system may be desirable to accommodate startup, shutdown, upset or feedstock variability, but will normally be operated as a closed system having only final product output and clean exhaust gas venting. The turbine exhaust optionally can be partially or temporarily wholly diverted to other downstream units, bypassing the dryer vessel, when needed for supplemental heat in other process units or for startup, shut-down or upset.

Another advantage provided by this invention is that the steam and off gases can be pulled from the discharge end of the dryer vessel by an appropriate fan, vent blower, etc., to provide a reduced pressure at the upstream entrance of the dryer vessel, thereby reducing the back pressure on the turbine exhaust. This increases the efficiency of operation of the gas turbine and is made possible because the connection between the gas turbine exhaust and the dryer vessel is not open to outside air. It will be understood that the commercial system design may include a vent or even a conventional silencer connected by tee or other configuration into the connection between the gas turbine exhaust and the dryer vessel for use during startup, shut down or upset operation, but would not be employed in the normal operating configuration for the process and apparatus of this invention as described above. To achieve best efficiency of operation of this invention, it is preferred that the connection between the gas turbine exhaust and the dryer vessel inlet have no obstructions in order to deliver the exhaust gases to the dryer vessel with a minimum of heat and energy loss between the gas turbine and the dryer vessel. It will also be recognized from this disclosure, that the operation of a gas turbine generator will preferably be controlled for optimal efficiency or economics for the manure feedstock drying, thermal conversion, chemical alteration and other processing needs, which may not be the optimal or best gas turbine operating conditions for electricity production. The electricity production is a cost recovery revenue stream for the system, but the overall economics of the operation of this invention may be better under gas turbine operating conditions that favor optimum exhaust heat output for efficient dryer vessel operation and downstream production of products having desired properties and disfavor electricity production. Determination of such operating conditions for a particular installation of this invention will be apparent to one skilled in the art following the teachings herein. Gas turbine control systems of this type are disclosed in commonly assigned copending U.S. patent application Ser. No. 10/894,875, filed on Jul. 19, 2004, the disclosure of which is incorporated herein by reference in its entirety.

Another advantage provided by this invention results from the contact of the gas turbine exhaust gas with the manure feedstock in the confined space of the dryer vessel without significant outside air present. The $NO_x$ and $SO_x$ emissions, and to some extent CO and $CO_2$ emissions, in the gas turbine exhaust are substantially reduced, and in some cases reduced to zero, by absorbing or complexing of the $NO_x$ and $SO_x$ components into the manure feedstock, where they remain absorbed, complexed or fixed in the fertilizer material exiting the dryer vessel and in the fertilizer product after processing into granular, pellet or prill form. This provides the double advantage of lowering or eliminating the emissions of $NO_x$ and $SO_x$ (and $CO/CO_2$) into the atmosphere and of adding the nitrogen, sulphur and carbon components to the nutrient value of the fertilizer produced by the process and apparatus of this invention.

The operating conditions and procedures for the dryer vessel will be apparent to one skilled in the art following the teachings herein of the disclosure of this invention. The typical turbine exhaust gas temperature entering the dryer vessel will be in the range of about 500° F. to about 1,500° F., depending on moisture and other content of the manure feedstock and the desired condition of the fertilizer or soil builder material output from the dryer vessel. In smaller systems with smaller engines, the inlet exhaust gas temperature can be as low as about 300° F. or about 350° F. A preferred range is from about 600° F. to about 1200° F., and it is more preferred that the inlet temperature be at least about 650° F. and most preferably at least about 700° F. The temperature and flow rate of the gas entering the dryer vessel will depend in part on the moisture content and other properties of the manure feedstock. Higher moisture content will obviously generally require higher inlet gas temperatures to reduce the moisture content. It is believed that an additional efficiency is achieved in the systems of the present invention where high moisture content manure feedstock is contacted with high temperature gases. Such contact causes the formation, sometimes instantly, of superheated steam as the moisture comes out of the manure feedstock, then that superheated steam heats and drives the moisture out of adjacent manure feedstock. It is believed that this mechanism is responsible for quick drying of the manure feedstock to a low moisture content so that the remaining residence time of the manure feedstock in the dryer vessel contributes to the desired thermal treatment/conversion/alteration or "cooking" thereof according to this invention. Some manure feedstocks may require lower temperatures but longer residence time to achieve the conversion or "cooking" needed to produce a self-binding product having the other desired properties discussed herein, particularly to meet "organic" standards. The temperature of the fertilizer or soil builder material exiting the dryer vessel will typically be in the range of about 150° F. to about 450° F. and preferably between about 200° F. and about 350° F. In some operations, the dryer vessel exit temperature of the fertilizer or soil builder material should be at least about 175° F. and preferably at least about 200° F.

The self-binding properties of the materials and products of this invention are an important preferred aspect of this invention. While conventional binders and additives can optionally be used to provide desired physical strength properties of the granules, pellets or prills in desired shapes and forms, it is preferred that the operating conditions should be those that cook and convert the manure feedstock to produce a self-binding product. Those operating conditions will depend on the moisture content and the organic matter content of the manure feedstock that is capable of being converted to components having binding characteristics. While not understood and not being bound by any particular theory, it is believed that starch, protein, carbohydrate and sugar components are converted to glutenous-like materials that can act as binders and that oil and ligand-type components are polymerized to act as binders. In any case, the operating conditions include temperatures of the exhaust gases, contact time between the manure feedstock and exhaust gases and the residence time of the manure feedstock solids in the dryer vessel at elevated temperatures. These conditions will determine the temperature to which the solids are raised and the length of time the solids are subjected to the elevated temperatures. Such temperature may not be a constant temperature for a particular increment of solids but may be a temperature profile rising over a period of time to a maximum, then descending over a period of time or may descend rapidly if the dryer vessel output is quenched at the exit. Optimum conditions to achieve an optimum self-binding product can be determined for a particular manure feedstock following the disclosure herein.

As used herein the term "fertilizer material" is used to refer to and means the dried manure feedstock which is produced in the dryer vessel by reducing the moisture content of the manure feedstock from an existing level to a lower level according to this invention and/or achieving the chemical alterations and conversions referred to herein. The "fertilizer material" is considered an intermediate product that is suitable for further processing into a final fertilizer product suitable for consumer, commercial or industrial use. Typically the fertilizer material from the dryer vessel will be processed by milling to produce a powder or meal, followed by granulating, pelletizing or prilling of the powder or meal to produce the final fertilizer product or soil builder product suitable for dry application in a crop growing operation. The fertilizer material can also be milled or otherwise powdered and made into a slurry or other liquid or pumpable fertilizer product that can be applied to the soil or in a crop growing operation in wet form, or pressure applied to hills or cliffs in remediation or seeding type applications, such as hydro-mulching, hydro-seeding and hydro-sprigging, or can be used to coat seeds for such uses or for seed drills or aerial planting. Similarly, the material the dryer vessel produces may optionally be processed to form a product similar to natural peat, but typically much higher (by 20%, 30%, 40%, 50% or 60% or more) in organic matter and lower in moisture content than natural peat. In the case where the manure feedstock is partially or mostly bioconverted, the material produced by the dryer vessel can still be formed into a peat-like product which is useful as a soil builder product. Even though such product may not be as high in nutrient value, it will be high in organic matter, as noted above. The raw output from the dryer vessel, whether from fresh or bioconverted feedstock, can be the final fertilizer or soil builder product which can be baled or packaged in a form desired and suitable for use in various agricultural and landscape operations. For example, it can be formed in long "snake" rolls, similar to the straw snake rolls, for use in erosion control at construction sites. Such rolls made from the materials of this invention will be just as effective at erosion control as straw rolls, but due to the higher nutrient and/or organic matter compared to straw, such rolls will encourage and enable earlier and more vegetation growth at that site to resist erosion after the rolls are disintegrated and no longer effective. The material from the dryer vessel can also be combined with binders, such as molten urea, to form a product for agricultural use. As used herein "fertilizer material" and "fertilizer product" are intended to refer to materials and products higher in plant usable nutrient values (typically made from fresh manure feedstock). And, "soil builder material" and "soil builder products" are intended to refer to materials and products having lower plant usable nutrient values (typically made from bioconverted manure feedstock or a feedstock low in manure content and high in other content such as straw, nesting material, etc.), but are nevertheless high in organic matter that is beneficial as a soil conditioner, soil builder or soil amendment. It is recognized that these materials or products can be blended with other materials or chemicals as disclosed elsewhere herein. It is also noted that the products produced by the systems of this invention, while preferred for fertilizer and soil builder use, can be used as fuel for heat or electricity production. Local economics will determine the end use made of the material produced from the dryer vessel or the final product produced from the system of this invention.

As used herein the term "granule," "granulating" and the like refer to any granular form of the material or product produced by this invention, including conventional granules, powder, dust, crumbs and the like, produced by conventional granulation processes and equipment, including crushing or crumbling previously formed pellets or prills. The term "pellets," "pelletizing" and the like refer to any pellet form of the materials or products produced by this invention, including cylindrical, bullet, spherical or other shape, typically made by conventional pelletizing processes and equipment, such as by extruding a slurry or paste and cutting, chopping, or breaking the extrudate to the desired size. The terms "prills," "prilling" and the like refer to any prill form of the materials or products produced by this invention made by conventional prilling processes and equipment, including spray tower processes, freeze drying processes, etc.

An extrusion pelletizer is one of the preferred process units for use in this invention because it takes advantage of the self-binding properties of the material produced in the dryer vessel, and because it can be operated under temperature and pressure conditions that may further provide or contribute to the "cooking" of the material to produce the basic and/or enhanced self-binding properties of the product of this invention. In a typical operation, the powder or meal from the milling unit may be mixed with steam or water, for example steam or condensed water vapor from the dryer vessel, sufficient to form material that is extrudable at high pressure and temperature to form pellets or other shapes. The temperatures in the extrusion pellitizer may be from heated screws, dies or drums or may be from the energy of high pressure compression. In either case the extrudable material is heated to a high temperature in the process. It is believed that for some manure feedstocks that the high temperature and pressure in the extruder pelletizer may further "cook" or convert certain components in the material to provide or contribute to additional or enhanced self-binding properties of the resulting pelletized, granulated or prilled product. Typical operating conditions for such an extrusion pelletizer will be an extrudable material having moisture content of up to about 20% by weight or higher, depending on the extruder equipment employed. Extruder temperatures and pressure will be those normally used in conventional extruder equipment. Other operating conditions can obviously be employed depending on the manure feedstock being processed and the desired properties of the formed product. The pellets produced may be dried to reduce the moisture content to a level suitable for stable product storage, e.g., about 10% by weight. The moisture removed at this point in the process can be recycled for use in other steps and processes of the systems of this invention, as disclosed herein.

The manure feedstock will typically have a moisture content between about 50% and about 90% by weight, preferably between about 60% and about 80% by weight and most preferably between about 65% and about 75% by weight. (Percent by weight, as used herein, is in reference to percent of the component in question based on the total weight of the mixture referred to.) Although manure feedstock of lower moisture content, for example, as low as about 40% by weight or even about 30% by weight can be processed in this invention. The preferred manure feedstock has a moisture content of at least about 50% by weight, more preferably at least about 60% and most preferably at least about 70% by weight. When the manure feedstock has a high moisture content in this range, processing advantages are achieved from the essentially instant production of steam and superheated steam at the inlet of the dryer vessel where the 1,000° F. exhaust gases contact the high moisture manure feedstock at atmospheric or subatmospheric pressure. The steam and superheated steam thus produced contributes to the drying, cooking and conversion of adjacent or nearby and downstream particles of manure feedstock, which enhances the efficiency of the process. It is preferred for operation of the process and apparatus of this invention that the manure feedstock be mixed and blended among batches or different parts (top, bottom, indoor, outdoor, etc.) of the same batches to provide a uniformity of manure feedstock properties. This preferred preparation enables the production of a more uniform fertilizer material from the dryer vessel, and simplifies control of the process operations. The temperature of the manure feedstock will typically be ambient, i.e., in the range of about 30° F. to about 100° F., but can be lower than 30° F., provided that any frozen agglomerations do not interfere with the feedstock preparation or the operation of the dryer vessel and feedstock feeder equipment. While manure feedstock is preferred to be at a low temperature to reduce or prevent composting or bioconversion of nutrients before processing according to this invention, it may be advantageous for process economics or for throughput capacity to preheat the manure feedstock prior to introduction into the dryer vessel. If preheating is used, it preferably is done just before use in this invention so composting and bioconversion are kept to a minimum. If such feedstock preheating is employed, it may be done in any desired fashion, such as heat exchanger, solar heating, heated conveyers or augers or heated concrete slabs in the staging and feedstock preparation area.

The contact time between the turbine exhaust gases and the manure feedstock will be determined by several variables including moisture content of the feedstock, moisture content desired in the dryer vessel output material, the chemical alteration/conversion desired, volume and temperature of the exhaust gases entering the dryer vessel and other factors. The contact time will be regulated to provide not only the drying desired, but also to elevate the particles of manure feedstock solids to sufficiently high temperatures to sufficiently destroy or convert to harmless forms, the undesirable components present in the feedstock, such as organisms, microorganisms, seeds, pesticides, antibiotics, hormones, prions, viruses and the like, when such conversion or destruction is desired, and to produce a self-binding product, when desired. The actual temperature attained by the particles is not important to determine, so long as the desired levels of said component destruction and conversion and the desired level of self-binding are achieved. The desired contact time can be varied and regulated by the dryer vessel volume and size and by the throughput volumes of the feedstock and exhaust gases. The heat transfer from the exhaust gases to the feedstock, and consequently the temperature to which the feedstock is heated, will mainly be a function of the mass ratio of exhaust gas to feedstock. An example of the dryer vessel operation with a gas turbine generator is a Rolls Royce Allison 501-KB5 generator (rated at 3.9 MW) having an exhaust gas output of about 122,000 lb./hr. at 1,000° F. and connected to a Scott Equipment Company, New Prague, Minn., USA rotary tubular dryer model AST 8424 having an internal volume of about 26 cubic meters ($m^3$). The manure feedstock is a fresh cattle feedlot manure having a moisture content of about 70% by weight and a temperature of about 65° F. is fed to the dryer vessel at a rate of about 6,500 kg./hr., which is about 10 $m^3$/hr., (about 16,200 lb./hr.) to provide an average or nominal residence time of the solids in the dryer vessel of about 10 to about 18 minutes and a weight ratio of exhaust gases to manure feedstock of about 7.5. The dryer vessel output is at about 200° F. The weight ratio of exhaust gas to feedstock will generally be between about 15:1 and about 1:1, preferably between about 10:1 and about 3:1 and more preferably between about 8:1 and about 4:1. The heat requirement may call for a ratio of at least about 20:1 or at least about 25:1 or higher where the feedstock is cold with a very high moisture content and the exhaust gas is not at a high or maximum temperature. The exhaust gas flow and the manure feedstock flow through the dryer vessel may be concurrent, countercurrent, single stage, multiple stage, etc., depending on results desired and various system designs and economic considerations.

The output from the dryer vessel comprises steam, water vapor, combustion gases and solids that are dried and/or thermally treated and converted to desired forms. Typical dryer vessel outlet temperatures of the gases and/or solids will normally range from about 200° F. to about 350° F., but lower or higher temperatures may be selected and/or desired for economic, product quality and/or process efficiency reasons. The outlet temperatures can be from at least about 110° F. to at least about 500° F., preferably at least about 180° F. and more preferably at least about 200° F. It is generally desired that the solids material exiting the dryer vessel will generally have a moisture content between about 10% and about 15% by weight, but can range from about 5% to about 25% by weight. Again, lower or higher moisture content of the dryer vessel output solids may be selected and/or desired for similar reasons. The steam, water vapor and combustion gases exiting the dryer vessel will normally be routed through heat exchangers (for recovery of process heat usable downstream in granulating or pelletizing operations or upstream in feedstock or turbine intake air preheating), condensers (for recovery of process water for upstream or downstream use, for agricultural application or for disposal), scrubbers, filters or cyclones (for recovering solids entrained in gases or liquids and rendering gases and liquids environmentally acceptable for release) and other conventional process equipment.

The solids output from the dryer vessel is referred to herein as fertilizer or soil builder material, which solids are typically further processed by milling, granulating, pelletizing, prilling or other processing to produce a final fertilizer or soil builder product in the form desired for final packaging or for bulk distribution. Such milling, granulating, pelletizing or prilling equipment and operations useful in this invention are those that are conventional and well-known, since the output from the dryer vessel comprises solid and vapor components that lend themselves to such processing. The dryer vessel solids output can be referred to herein as the fertilizer or soil builder product when used in its raw form for crop application without further processing into powder, granular, pellet or prill form. The dryer vessel output is referred to as a soil conditioner material or product when the manure feedstock is of a type that produces a material having low nutrient value as a fertilizer, but is nevertheless useful as a soil builder or conditioner having high organic matter content, similar to a peat type product, or may be a combination of fertilizer and organic matter soil builder product. Whatever the product in whatever form, the process, system and equipment of this invention provide for environmentally and economically effective processing of manure feedstocks to remove them as environmental liabilities and provide products which are useful to improve soil conditions, sequester carbon in the soils or other environmentally advantageous applications, and to eliminate disposal in a landfill.

This invention can be used to produce a variety of products and materials from manure feedstocks, but the preferred materials and products are those that have no significant undesirable components remaining that have not been converted or destroyed in the heating, chemically altering and/or drying treatment in the dryer vessel or other operations. The products and materials produced by this invention are preferred to be useful fertilizer or soil builder products, but this invention is also useful in producing reduced-volume solids for disposal in landfill with the advantage of providing solids having low levels or no amounts of harmful components to leach out from the landfill into surface or ground water.

The products and materials produced by this invention are useful for and include blends with other materials, products or chemicals, as may be desired for particular end uses requiring particular properties or characteristics. Such other materials and additives can be added and blended at any appropriate point in the process: blended with the manure feedstock, added to the dryer vessel, added in the process water at any point, added to the material exiting the dryer vessel, added as part of any milling, granulating or pelletizing processing or simply mixed with the final product or blended in before bagging or packaging or at the point of use. For example the fertilizer and soil builder products, while usually relatively odor free, can be blended with other materials that can either provide a pleasant odor or mask any unpleasant odor. Such materials can be synthetic (perfumes) or natural, with natural materials being preferred. Natural, organic materials can include sage, mint, fennel, garlic, rosemary, pine, citrus and similar materials that would not prevent certification as an organic input. Other materials for blending can include iron, minerals, carbon, zeolite, perlite, chemical fertilizers (urea, ammonium nitrate, etc.), pesticides and other materials to adapt the fertilizer or soil builder product for specialized use. Although certified organic products are the most preferred products of this invention, the products of this invention can include any conventional NPK fertilizer blend or mixture in any conventional form, including extended release forms. For example, the fertilizer products of this invention may include added herbicides (for typical "weed and feed" products) and other additives that may be organic based or chemical that may or may not qualify for certified organic status. It is well known in the art to make fertilizer products in desired granule or particle size having desired hardness and integrity in dry form, but readily dispensable when applied to an agricultural operation and treated with water by irrigation or rainfall. For example, see U.S. Pat. No. 4,997,469 to Moore and U.S. Pat. No. 5,676,729 to Elrod et al., the disclosures of which are incorporated by reference in their entirety.

In some cases, a product can be granted organic certification provided the levels of man-made components, including genetically modified organisms, chemical fertilizers, other materials that are not organic, etc., in the final product are typically below about 5% by weight or in other cases for "natural" labeling, below about 30% by weight. On the other hand inputs into organic fertilizers and organic soil builder products can contain essentially no detectable amounts of other materials identified as undesirable components, such as undesired organisms and microorganisms (including genetically modified organisms), pathogens, viable seeds, pesticides (including insecticides, herbicides, algicides, rodent poisons, etc.), antibiotics, hormones, prions or viruses. However, in other cases the product will qualify for organic certification even if certain of these undesirable components in the final product are detectable but are below a specified level. As used herein "microorganism" is used to include bacteria, protozoa, fungi and algae. However, it will be recognized that not all microorganisms are undesirable in a fertilizer or soil builder product, even in certified organic products, but certain microorganisms are undesirable and are to be destroyed, inactivated, killed or otherwise converted to harmless forms by the thermal treatment according to this invention, such as pathogenic bacteria. Since the standards set by the various agencies for organic products differ somewhat and are changed periodically, it is not practical to set forth the details here. It is important to note, however, that when a product is selected for production in the system of this invention, the operating conditions of the processes of this invention can be varied over wide ranges and selected to provide the conversions and purifications needed to meet the applicable standards and produce products that can be certified organic.

The systems of this invention include configurations that can be used to reduce and in some operations essentially eliminate the emission into the atmosphere of noxious odors and greenhouse gases from animal feeding operations and from municipal sewage facilities. As noted above, in addition to bioconversion of animal waste, one of the major sources of greenhouse gases (methane in particular) and noxious odors is from the gases produced in the enteric fermentation in the animals themselves and the release of those gases by the animals by eructation, emission of flatulence and the essentially immediate release of those gases from urine and feces upon evacuation from the animals, referred to herein as "animal gases." Animal feeding operations are coming under increasing regulation by federal and state agencies due to increasing pressure from population areas near the animal feeding operations. The regulation is directed to two aspects of air quality. The first is noxious odors from animal gases and bioconversion emissions, which contain mercaptans and many other organic compounds that have offensive odors and which are objectionable to residential communities. The second is greenhouse gas emissions that are harmful to air quality. Greenhouse gases include $CO_2$, $CH_4$, and $N_2O$ and are usually referred to in terms of $CO_2$ equivalent effect on the atmosphere. Methane has a $CO_2$ equivalent factor of about 23 (as used by the USDOE), which means that 1 kg of $CH_4$ released into the atmosphere is equivalent to 23 kg of $CO_2$ released. (Some sources give the equivalent factor as about 21.) In the United States Department of Energy/Energy Information Administration Report # DOE/EIA-0573 (2002) released October 2003 (available at www.eia.doe.gov/oiaf/1605/ggrpt/) it is estimated that 8 million MT of $CH_4$ (183 million MT $CO_2$ equiv.) was released into the atmosphere in 2002 by agricultural operations, which was about 30% of all $CH_4$ emissions in the U.S., the other sources including landfill and municipal sewage treatment operations. Of the agricultural $CH_4$ emissions, 94% was from livestock operations, of which 67% (about 5 million MT) was from enteric fermentation (animal gases) and 33% (about 3 million MT) was from decomposition of livestock wastes. While $CH_4$ is the main greenhouse gas produced by bioconversion of manure, $CO_2$ and $NO_x$ gases are also produced. It is particularly desired to prevent $NO_x$ release into the atmosphere, because it is estimated that it has a $CO_2$ equivalent of about 310. This invention can be used, as disclosed herein, to essentially eliminate atmospheric release of animal gases and essentially eliminate the decomposition greenhouse gas emissions from animal feeding operations by containing and processing the animal gases, by processing the manure feedstock to prevent decomposition or bioconversion taking place and/or containing and processing emissions from decomposition or bioconversion that takes place before the manure feedstock can be processed.

The systems of this invention are particularly useful in essentially eliminating the animal gas emissions and odors from animal gases in certain existing animal feeding operations. Other animal feeding operations can be easily modified according to the disclosure herein to utilize the systems of this invention to reduce or eliminate release of animal gases and associated odors into the open atmosphere. In the basic system of this invention, the gas turbine exhaust is connected to the dryer vessel. To control animal gases produced in an animal feeding operation, the gas turbine air intake is connected to the animal shelter ventilation system so that the ventilation air exhausted from the animal shelter is directed into the gas turbine air intake where two processes normally will take place. First, the animal gases are burned along with the regular fuel supply, thereby converting the $CH_4$ to $H_2O$ and $CO_2$ and converting the mercaptans and other noxious or acrid compounds to $H_2O$, $CO_x$, $NO_x$ and $SO_x$. Second, the exhaust gases from the gas turbine are contacted with the manure feedstock, where the $NO_x$ and $SO_x$ and to some extent $CO_x$ gases are absorbed into or complexed with the manure feedstock as it is dried and/or converted to a fertilizer or soil builder material, and preferably to a self-binding fertilizer or soil builder product. This aspect of this invention prevents the animal gases from entering the atmosphere.

The existing animal feeding operations that can immediately directly and efficiently utilize this invention for control of animal gases are those that are normally completely enclosed and ventilated by fresh air inlets and exhaust air outlets, and particularly those that are climate controlled by heating and air conditioning. The climate controlled animal feeding operations are typically the chicken and hog operations, although some dairy, veal, beef and other operations are enclosed and climate controlled due to extreme heat or cold in the local climate. The exhaust air from such facilities is directed to the gas turbine combustion air inlet. Other animal feeding operations that have free-stall or open barn structures can take advantage of this invention by pulling vent air from the top of the structure and ducting it into the turbine air inlet. This will capture a significant portion of the animal gas, particularly on zero wind days, because the methane in animal gases is lighter than air and will rise to the top of the structure. In addition, such structures can be economically enclosed (e.g. by canvas walls) and ventilated by forced air (with or without climate control) to collect essentially all the animal gases from the animals in the structure and directing the exhaust vent air to the gas turbine air intake.

In utilizing this aspect of this invention it will be recognized that it is preferably operated so that all the ventilation air exhausted from the hog barn, chicken house, etc. is fed to the gas turbine air intake to prevent release of animal gases to the atmosphere. Any remaining combustion air needed for the gas turbine will be from ambient air through a conventional air filter, although it is preferred that the animal barn exhaust vent air also pass through the gas turbine intake air filter to prevent damage or erosion of turbine components by entrained dust or other particles. The solids collected in the air filter can be fed to the dryer vessel or to other process units in the system for incorporation into the final fertilizer or soil builder product. Although the methane in the animal gases will not normally constitute a significant portion of the fuel requirements of the system, it is burned to produce heat and is not released to the atmosphere. Nevertheless, every kg of animal gas methane burned reduces the outside methane fuel requirement by one kg and reduces greenhouse gas emissions by $CO_2$ equivalent of 23 kg. This aspect of the invention also provides the benefit of turbine inlet noise control. Similar to the dryer vessel acting as a silencer for the turbine exhaust, having the turbine inlet enclosed and air ducted in a closed system from the animal barn substantially contains and muffles the high frequency turbine inlet noise.

It will also be recognized that, while the above description is in terms of using a gas turbine, the same utilization of this aspect of this invention to control animal gas emissions can be made using whatever heat source is selected for use in the system. Whether the heat source is a gas turbine, gas turbine generator, reciprocating gas or diesel engine or even a conventional oil or gas burner (like 107 in FIG. 1), the animal shelter exhaust vent air can be directed to the combustion air intake so the animal gases are burned and preferably so the combustion gases are contacted with the manure feedstock.

As further disclosure and illustration of the processes, systems and equipment of this invention, reference is made to the schematic flow chart of FIG. 1. In the exemplary process illustrated, gas turbine generator unit 100 comprises gas turbine 101 and electric generator 102. The gas turbine has air intake filter 104 (which can optionally include animal shelter ventilation air, such as 903 in FIG. 5) and fuel feed 103. If desired, optional bypass exhaust silencer 106 can be included for startup, shutdown or upset conditions during those times the gas turbine is running but the exhaust gases cannot be directed into the dryer vessel. However, dryer vessel 200 will function as the silencer in the normal operation of the system of this invention. Alternatively, instead of silencer 106, the exhaust gas bypass (see 908 in FIG. 5) around the dryer vessel can be directed to any appropriate downstream unit, such as separator 208 and/or separator 600, which can provide a temporary silencer function. This arrangement eliminates the cost of a separate silencer and the space required for a separate silencer, which is an important consideration for the portable, truck-mounted systems. The gas turbine 101 exhaust is connected to the dryer vessel 200 by connector 105. An optional air inlet (not shown) can be included for dryer vessel 200 in connector 105 or elsewhere for purging the dryer vessel or the system, for startup or shutdown or for other reasons, particularly when either the exhaust gases or the manure feedstock is not present in the dryer vessel 200. However, when both are present, any such air inlet is closed and not used in order to substantially preclude introduction of air into the dryer vessel and to preclude significant oxidation of materials being processed in the dryer vessel 200. Optional burner 107 can also be included to provide supplemental heat source and combustion gases for the dryer vessel, which can be provided for input in connector 105 or elsewhere. The optional supplemental heat source may be useful during startup, shutdown, process upset, turbine outage or to maintain desired throughput when a peak load or unusually high water content feedstock is encountered.

The manure feedstock is typically introduced into the system by mechanical means, such as a front end loader 201, which drops the feedstock into a rock separator, mixer, chopper unit 202. The feedstock can be further mixed and foreign objects separated in screw conveyors 203, 204 then fed to the dryer vessel 200 through 215. The feedstock can also be pre-mixed or conditioned for desired uniformity prior to loading into this system by loader 201, e.g., in storage windrows that can be combined and mixed.

The output from the dryer vessel 200 is transferred by conduits 205, 206 to separator 208 where the solids and gases are separated. The gases pass through 209 and blower 210 to the atmosphere via 211 or to other downstream processing via 212. Blower 210 can be operated to lower the pressure in separator 208 and in the dryer vessel 200, which will reduce the water boiling point in the dryer vessel and will reduce the water boiling point in the dryer vessel and will reduce the backpressure on the turbine exhaust and increase the turbine output and efficiency. Alternatively, blower 210 can be operated to maintain increased pressure in dryer vessel for higher temperature treatment, conversion or "cooking" of the manure feedstock, if desired. The output from dryer vessel 200 can pass through optional heat exchanger 207 for recovery of process heat for use downstream or in preheating the manure feedstock or turbine intake air. The solids output from separator 208 pass to ball mill or hammer mill 300 via conduit, conveyor or auger 301 and optional mixers and conditioners 302 and 303. In addition, recycled solids, such as fines, from recycle loop 305 can be mixed in at 303 via 304 to be combined for feeding to the ball mill or hammer mill 300. The fines and off spec material generated at various points in the system can be collected and recycled via loop 305 and reintroduced into the product processing system at any desired point for further processing, such as the milling unit 300 via 304, the pelletizing unit 400 via 404 or even the manure feedstock preparation 202, 203, 204 or other points. An important capability of the system of this invention is the complete recycle via recycle loop 305 of all fines or off spec solids so that they are eventually incorporated in the final products. Thus, the system of this invention provides 100% conversion of the manure feedstock solids (except for rocks and other foreign objects that are not processible) into the fertilizer or soil builder products and does not produce a solids waste stream that must be otherwise disposed of, such as in a landfill.

The ball mill or hammer mill 300 is used to produce a uniform small particle size, short fiber length material called "meal" which is suitable for processing in pelletizer unit 400 to provide a product that has sufficient hardness and mechanical durability and stability for the conventional processing, packaging and storage normally used for dry fertilizer products. The output of ball mill or hammer mill 300 goes through separator 310 where vapors are taken off and sent via 315 to separator 600 for recycle of solids via recycle loop 305 and venting of vapors to the atmosphere via blower 601 and vent 602. Separator 310 takes out fines or material suitable for recycle via recycle loop 305 and passes the meal to mixer 311. The meal is then sent via 312 to separator 401 and either direct to pelletizer 400 via 408 or to holding or surge bin 402 via 409a and 409b for mixing with other materials, recycle materials from 404 or additives or for holding in case of process startup, shutdown or upset. From surge bin 402 the meal is sent through mixer 403 and either directly to the pelletizer unit 400 via 417 or to mixer 311 via 412 for mixing with fresh meal when desired.

The pellets from pelletizer 400 are passed through heat exchanger, vapor removal unit 405 and from there sent via 406 and 414 either direct to final product cleaning in units 407 and 415 and finished product shipping or storage bin 500 via 416a, 416b, 501 and 503, or sent via 413 and surge bin 410 to a crumbler or granulator unit 411 then to final product cleaning units 407 and 415. The final product is loaded in truck 502 via 501, 503 or via storage bin 500 for transport to market. The fines and off spec product separated out in final cleaning unit 415 can be recycled for reprocessing via recycle loop 305. The crumbler or granulator 411 converts the pellets to smaller particle or granular size having essentially the same hardness and mechanical durability and stability as the pellets. The solids can be transported between processing units of this invention by conventional augers, elevators, conveyor belts, pneumatic tube conveyors and the like, as appropriate for the material and for environmental considerations. As is apparent, the system can be designed and configured to produce a fertilizer material or soil builder product from dryer vessel 200 (that can be baled for direct use), meal from mill unit 300 (that can be bagged for later processing or for direct use) or a granular product, a pellet product or a prill product from 415.

An example of the operation of the system according to this invention can be seen from the following table. This example is based on the use of a Rolls Royce Allison 501-KB5 (rated at 3.9 MW) gas turbine generator and a Scott Equipment Co. dryer model AST 8424 processing fresh cattle manure at a feedlot operation.

Example of System Sized for Nominal 2.5 Metric Tons/Hr Finished Product

| FIG. 1 Stream No. | Component | Flow Rate | Condition |
|---|---|---|---|
| 103 | Natural Gas | 820 kg/hr | Ambient Temp. |
| 104 | Combustion Air | 48,140 kg/hr | Ambient Temp. |
| 105 | Exhaust Gases | 48,960 kg/hr | 1,200° F. |
| 215 | Manure Feedstock | 6,500 kg/hr | 70% $H_2O$/ Ambient Temp. |
| 200 | Residence Time | 10–18 min. | |
| 301 | Dried Material | 2,730 kg/hr | 12% $H_2O$ by wt. 200° F. |
| 312 | Meal | 2,500 kg/hr | 10% $H_2O$ by wt. 125° F. |
| 503 | Pelletized Fertilizer Product | 2,500 kg/hr | 12% $H_2O$ by wt. 15° F. above Ambient Temp. |

Figure 2:
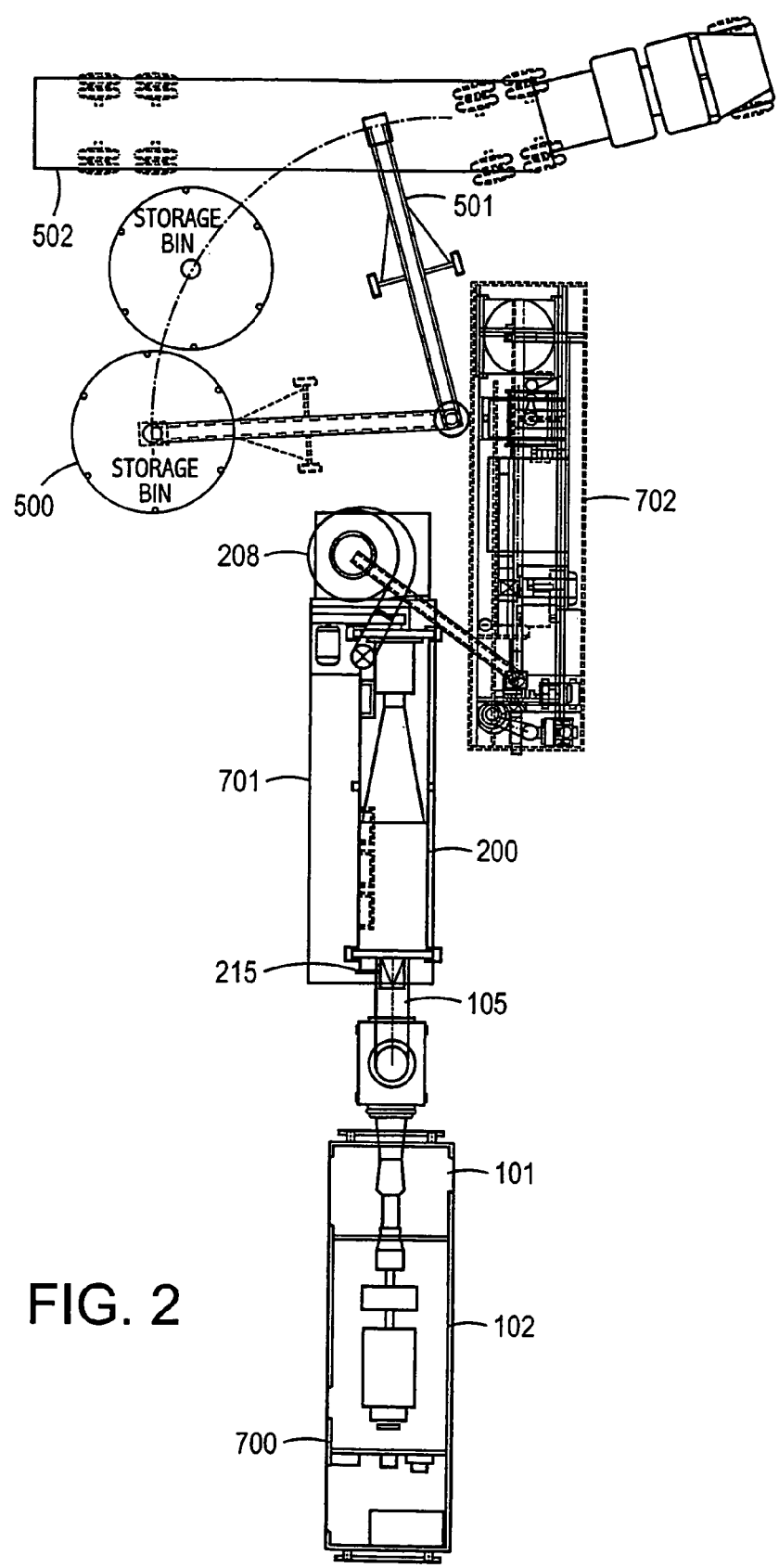
FIG. 2 is a plan view of the process units according to this invention in the form of portable skid-mounted, truckable units.

FIG. 2 illustrates one configuration of the system of this invention in the form of skid-mounted, truck mounted or rail car mounted units that can be transported to and operated at desired agricultural or municipal operation sites where manure feedstock is available on a daily or periodic basis. The first unit 700 comprises the gas turbine 101 and generator 102. The second unit 701 comprises dryer vessel 200 and separator 208. The dryer vessel 200 has manure feedstock inlet 215 and is connected to the gas turbine exhaust by connector 105 when stationary and in operation. The third unit 702 comprises the processing equipment desired for a particular operation, such as the ball mill and pelletizer. The product output is conveyed by 501 to storage units 500 or to truck 502 for transport to market. Optional equipment can also include units for bagging and other packaging of the final product for various markets.

Figure 3:
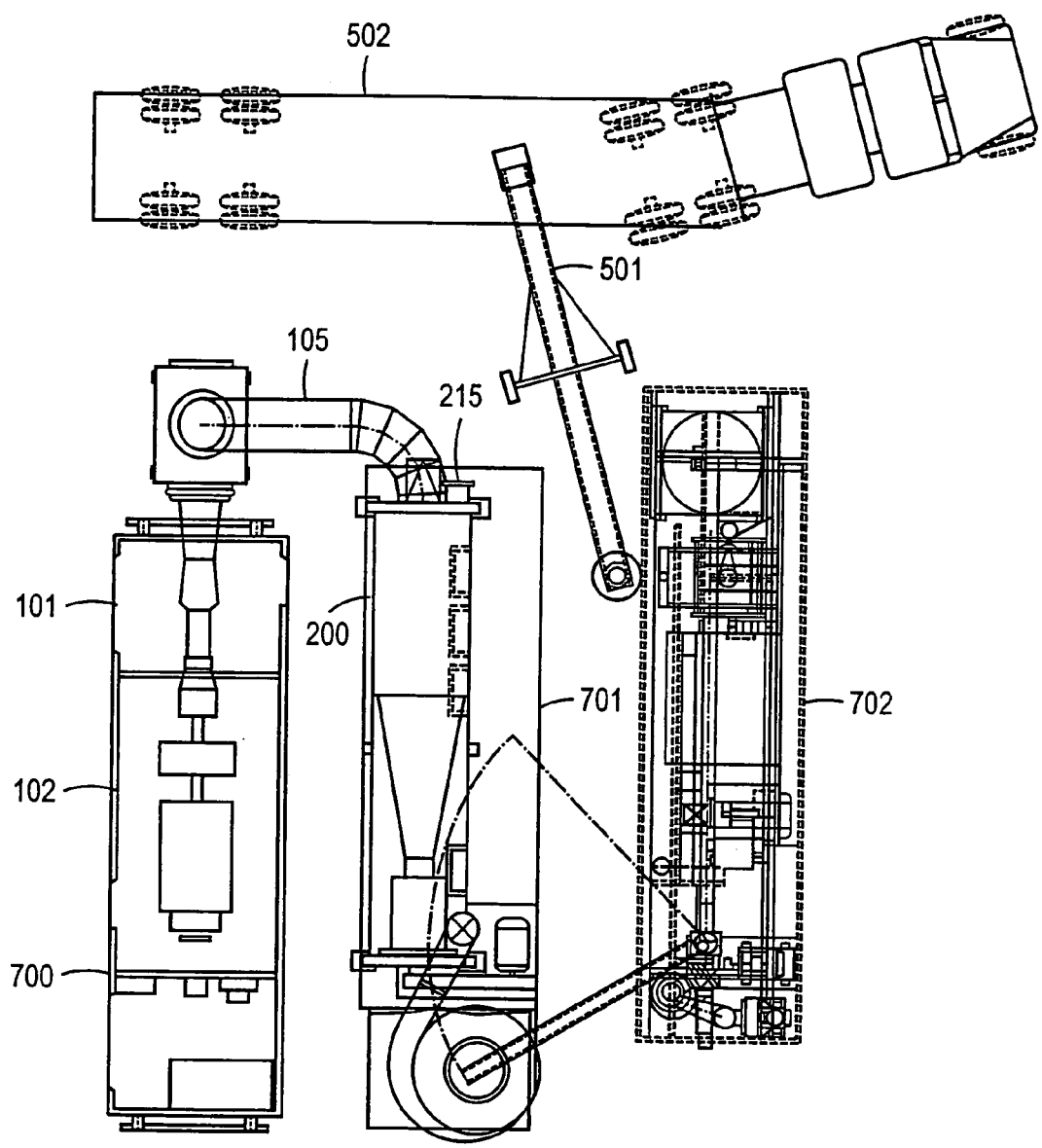
FIG. 3 is a plan view of the process units according to this invention in the form of portable skid-mounted, truckable units in another configuration.

FIG. 3 is an illustration of the same units as in FIG. 2, but positioned on the operation site in a different configuration. It is apparent that the portable, truck-mounted units of this invention are adaptable to a variety of sites that may have limitations on space available.

Figure 4A:
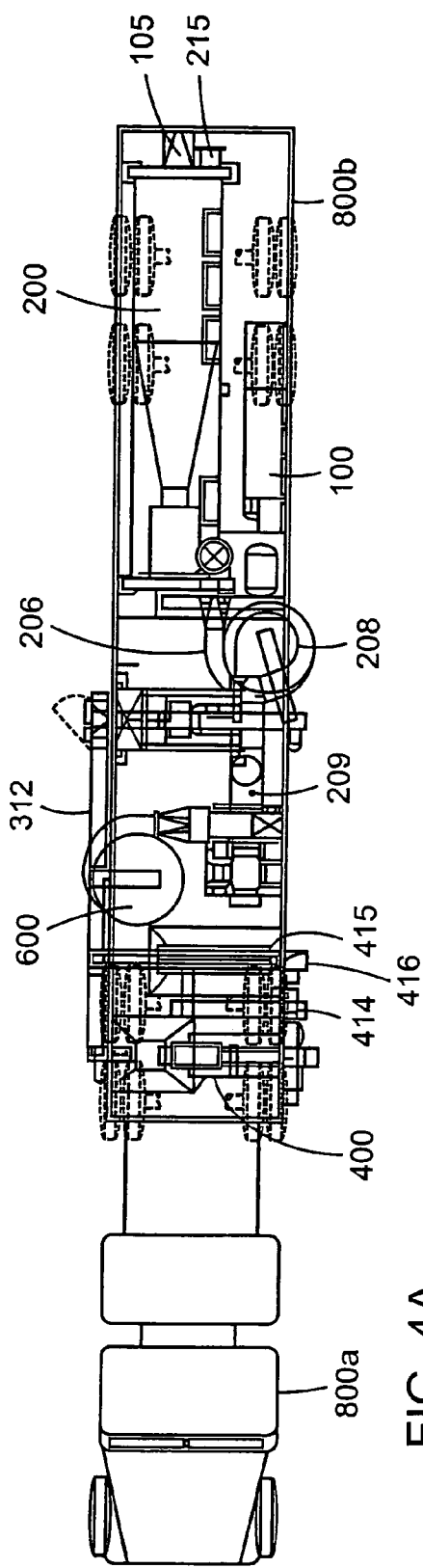
FIG. 4A is a plan view and FIG. 4B is an elevation view of an illustration of a configuration of the system of this invention mounted on a semitrailer truck.
Figure 4B:
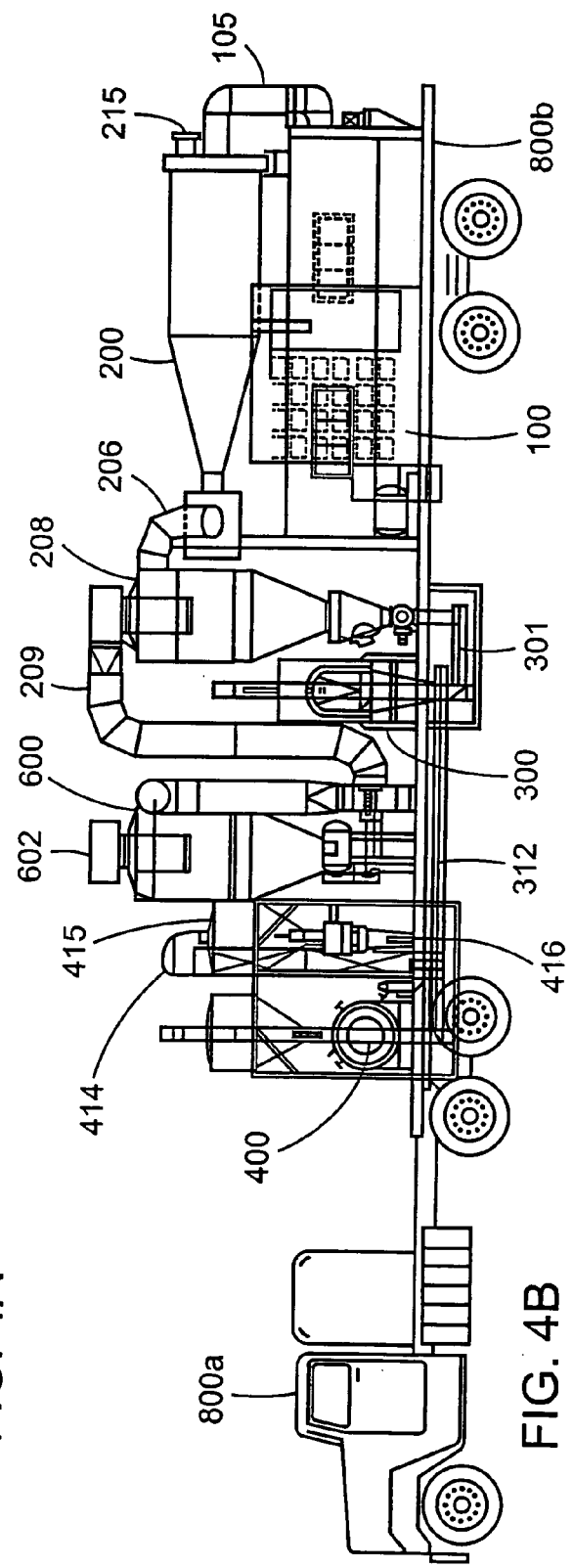

FIG. 4A is a plan view and FIG. 4B is an elevation view of another portable configuration of the system of this invention wherein all operating units are mounted on a single semitrailer truck 800a and 800b. Gas turbine unit 100 exhaust is connected to dryer vessel 200 by connector 105. Dryer vessel 200 has manure feedstock inlet 215 and is connected to separator 208 by conduit 206. Separator 208 is connected to vapor/air cleaner separator 600 by conduit 209 and separator 600 vents to the atmosphere by vent 602. The bottom outlet of separator 208 is connected via conduit 301 to ball mill unit 300. The outlet of ball mill unit 300 is connected via conduit 312 to pelletizer unit 400, which is connected to product cleaning unit 415 by conduit 414. Cleaning unit 415 has product outlet 416. Not shown in FIGS. 2, 3 and 4 is an optional enclosure for each skid-mounted or truck-mounted unit to enclose the entire unit for weather protection and for noise attenuation.

Figure 5:
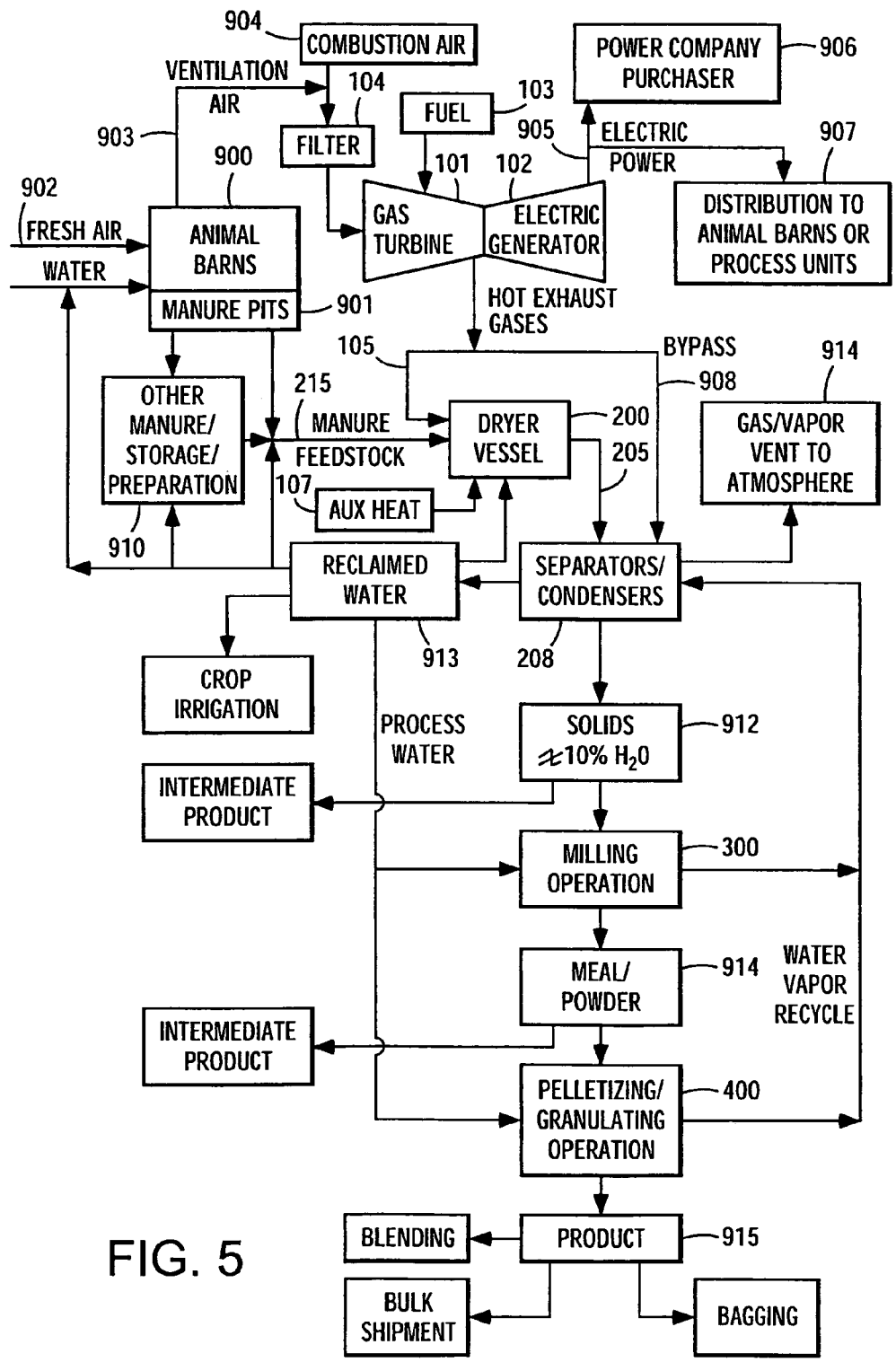
FIG. 5 is a schematic of processes for preventing emission of animal gases and greenhouse gases to the atmosphere using the systems of the present invention.

FIG. 5 is a schematic process flow chart of some of the optional systems of this invention. In a preferred operation of this invention, animal barns 900 and manure pits 901 are enclosed and ventilated with fresh air 902. The ventilation air 903 from the animal barns is fed to the gas turbine 101 as part of the combustion air feed 904 through air filter 104. The manure pits 901 can be within the same barn enclosure or can be separate holding tanks or lagoons that are enclosed so that all vapors given off by the manure can be contained and passed to the gas turbine 101 along with the barn ventilation air 903 for combustion along with the conventional fuel 103, such as locally available natural gas. This prevents greenhouse and noxious or acrid gases from the animals and the manure from being released into the atmosphere, including biogases from any bioconversion that takes place before the manure can be processed in the system of this invention. Not only does this provide the opportunity for commercial use of this invention to obtain air quality credits for reduced greenhouse gas emissions, it also provides animal feeding operations a way to become acceptable neighbors with nearby residential areas, because all noxious and acrid odors from the animals and the manure can be contained within the system and incorporated in the final fertilizer product or converted to components that are not noxious or acrid before venting to the atmosphere. As noted above in the DOE/EIA Report, the total methane given off by a livestock feeding operation, about two thirds is from enteric fermentation (animal gases) and about one third is biogas from bioconversion of manure. Thus, in conventional biogas operations that use as fuel the methane from bioconversion of manure, two thirds of the methane from the livestock feeding operation is released into the atmosphere in the animal gases, while only the one-third from bioconversion is contained and utilized. In contrast, use of this aspect of this invention not only prevents the formation of the methane in biogas because this invention substantially prevents bioconversion and retains all the nutrient values from the manure in the fertilizer product, but also contains and utilizes most or all of the other two-thirds methane in the animal gases as fuel and converts all other noxious and acrid gases from a livestock feeding operation to other compounds which are either absorbed or complexed in the fertilizer product or are not objectionable for release to the atmosphere.

The gas turbine generator 101/102 produces electric power 905, which can be either sold to the local power company 906 or distributed by 907 for use in the animal feeding operation or the processing units in the systems of this invention. Some animal feeding operations will find that the cost of enclosing an open animal barn and installing and operating heating and air conditioning climate control in order to contain and process all greenhouse gases via 903 can be at least partially if not substantially off set by using the electricity 905 for operation of the climate control system. For example, it may be feasible, or necessary in some instances due to governmental regulation, to cover a normally open feedlot or dairy operation with inflatable tents, similar to those used for tennis courts, to provide economical systems for containing and collecting all animal gases from such an operation, so those gases can be processed via 903 according to this invention. The economics of each commercial operation, fuel costs, selling price/purchase price of electricity and capital cost of equipment will determine whether the electricity is used internally in the animal feeding operation, sold to the power company, used in other nearby operations or any combination thereof.

The exhaust gases from the gas turbine 101 are passed to dryer vessel 200 by a connection 105 that precludes outside air from entering the dryer vessel. As disclosed herein, the system is operated so that the oxidation of the manure feedstock in the dryer vessel 200 and elsewhere in the system is minimized and substantially avoided. The dryer vessel 200 also serves as silencer for the gas turbine. An optional bypass 908 can be provided so the exhaust gases can be sent to downstream equipment, such as separators/condensers 208, to silence the gas turbine exhaust when the dryer vessel is off line and to clean the exhaust gases before release into the atmosphere during such temporary operation. Or, the bypass 908 exhaust gases can be sent to a heat exchanger for water heating, animal shelter heating or other climate control or process energy requirements. This bypass eliminates the cost of having a separate silencer to satisfy noise restrictions on the gas turbine when the dryer vessel is off line and provides a more compact design for portable or truck mounted units.

Manure feedstock 215 is fed to the dryer vessel 200 along with the exhaust gases from connection 105 and any auxiliary heat provided from alternate or auxiliary heat source 107. The manure feedstock preferable comes directly from the manure pits 901 in animal barns 900 so it is fresh and has little or no time for bioconversion. Other manure feedstock sources 910 can be used or included in the system, such as stockpiled manure or manure from other operations that is brought in to be combined or mixed with the manure from the immediate animal barn. As disclosed herein, other green waste, organic materials, inorganic materials or additives can be combined with the manure for processing in the system of this invention.

The output from dryer vessel 200 is sent via 205 to the separators/condensers designed to separate the solids 912 for further processing downstream, to condense the water vapors as reclaimed water 913 and to clean the gases 914 vented to the atmosphere. The reclaimed water can be used downstream as process water, recycled for use in preparing or conditioning the manure feedstock, used for livestock water or used for crop irrigation. The solids output 912 from the separator units 208 is normally further processed by milling, pelletizing, granulating, bagging, etc. However, the solids 912 can be used as an intermediate to form other types of products. For example, it can be baled for use much like a peat material, it can be formed into bricks, rolls and other shapes for use in erosion prevention much like straw rolls are used (but having higher nutrient or soil builder value than straw), it can be used alone or in combination with other materials for incineration to utilize the fuel value of the material, it can be used in a bioconversion system to produce a methane or biogas fuel, it can be used as an animal feed, or it can be stored for any desired use or further processing at a later time. Similarly the meal/powder output 914 from the milling operation is normally further processed by pelletizing, granulating, etc., but can be used as an intermediate to form other types of products, such as slurry for spray application, hydro-mulching, etc. The final product 915 is preferred for use as a fertilizer, but is also useful as above for the intermediate products.

In each of the downstream operations, water vapor may be recovered and recycled to the separators/condensers 208 for reuse. As is apparent, the systems of this invention are adaptable to various configurations and various designs depending on the processing needs and economics of particular animal feeding operations. Various conventional heat recovery and recycle aspects, not shown in FIG. 5, can be designed into commercial installation of the systems of this invention by using ordinary process engineering design skills, including the fines recycle 305 shown in FIG. 1, use of gas/vapor stream 914 for various heat recovery and pre-heating applications, insertion of binders, additives and blending materials at various desired points in the system, cooling the combustion air and/or animal barn ventilation air, e.g., by water spray, to increase efficiency and power output of the gas turbines, dewatering very high water content manure feedstock, etc. The final pelletized, granulated or prilled product 915 can be bagged or shipped bulk for conventional end use applications.

As will be apparent to one skilled in the art, multiple gas turbines, other engines and/or burners of the same or varying types and sizes can be manifolded together to feed multiple dryer vessels of the same or varying types and sizes in a single installation. This can be done to not only provide increased feedstock processing capacity but also to provide operational flexibility for processing varying feedstock loads and for performing equipment maintenance without shutting down the operation.

While we have illustrated and described various embodiments of this invention, these are by way of illustration only and various changes and modifications may be made within the contemplation of this invention and within the scope of the following claims.

We claim:

1. A method of making a fertilizer product from manure feedstock comprising:
    operating a gas turbine generator to produce electricity and exhaust gases;
    contacting the exhaust gases with the manure feedstock having a moisture content of at least about 30% by weight, in a dryer vessel for a contact time sufficient to produce, without significant oxidation of the manure feedstock, a dried fertilizer material having a moisture content less than about 20% by weight; and
    processing and forming the fertilizer material into a granular, pellet or prill form of fertilizer product suitable for conventional dry fertilizer application in a crop growing operation.

2. A method according to claim 1 wherein the manure feedstock comprises a moisture content of at least about 50% by weight.

3. A method according to claim 1 wherein the fertilizer material comprises a moisture content less than about 15% by weight.

4. A method of making a fertilizer or soil builder product comprising:
    producing hot combustion exhaust gases from a gas turbine, oil or gas burner or reciprocating engine;
    directing ventilation air from an animal shelter into the combustion air intake of the turbine, burner or engine;
    contacting the hot combustion exhaust gases with a manure feedstock; and
    drying the manure feedstock for a contact time sufficient to produce a dried fertilizer material.

5. A method according to claim 4 comprising contacting the exhaust gases with the manure feedstock in an enclosed system adapted to substantially prevent significant oxidation of the manure feedstock.

* * * * *